United States Patent
Weber et al.

(10) Patent No.: US 9,352,512 B2
(45) Date of Patent: May 31, 2016

(54) FLEXIBLE FILM HEATED ROLLER

(75) Inventors: Clifford J. Weber, Richfield, OH (US); Scott M. Azzarello, Garfield Heights, OH (US); William A. Briese, Hinckley, OH (US); Roger J. Eberwein, Brunswick, OH (US); Michael H. Ritter, Cuyahoga Falls, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 689 days.

(21) Appl. No.: 13/433,525

(22) Filed: Mar. 29, 2012

(65) Prior Publication Data

US 2012/0261049 A1    Oct. 18, 2012

Related U.S. Application Data

(60) Provisional application No. 61/474,809, filed on Apr. 13, 2011.

(51) Int. Cl.

| | |
|---|---|
| B29C 65/00 | (2006.01) |
| B29C 65/14 | (2006.01) |
| B29C 63/00 | (2006.01) |
| B29C 63/02 | (2006.01) |

(Continued)

(52) U.S. Cl.
CPC ....... B29C 66/91421 (2013.01); B29C 63/0065 (2013.01); B29C 63/02 (2013.01); B29C 65/1412 (2013.01); B44C 1/10 (2013.01); *B29L 2031/005* (2013.01)

(58) Field of Classification Search
CPC  B29C 65/1412; B29C 63/02; B29C 63/0065; B29C 66/83413; B29C 66/91421; B29C 66/91423; B29C 66/91431; E06B 3/30; B32B 37/0053

USPC ............ 156/358, 582, 583.1, 308.2, 64, 212, 156/213, 309.6

See application file for complete search history.

(56) References Cited

U.S. PATENT DOCUMENTS

| | | | |
|---|---|---|---|
| 3,356,062 A | 12/1967 | Crowe | |
| 4,001,545 A * | 1/1977 | Wada et al. | 219/216 |

(Continued)

FOREIGN PATENT DOCUMENTS

| | | |
|---|---|---|
| EP | 0252066 | 6/1987 |
| EP | 1475491 | 11/2004 |

(Continued)

OTHER PUBLICATIONS

"Hot Stamp Equipment Model DR-1" CPS Resources, Inc. Nov. 2006.*

(Continued)

*Primary Examiner* — John Goff
(74) *Attorney, Agent, or Firm* — Tarolli, Sundheim, Covell & Tummino LLP

(57) ABSTRACT

A film application system having multiple film application stations. Each film application station has a support for an elongated plastic component (typically vinyl) having an input and an output side. A properly positioned and oriented transfer head includes a heated roller which applies heat and pressure to the elongated film as the component moves through the application station. The roller is most preferably heated with multiple IR heaters controllably energized to achieve a desired roller temperature without too large a gradient of temperature difference across the film application contact surface of the roller.

14 Claims, 21 Drawing Sheets

(51) Int. Cl.
*B44C 1/10* (2006.01)
*B29L 31/00* (2006.01)

(56) References Cited

U.S. PATENT DOCUMENTS

| | | | |
|---|---|---|---|
| 4,220,492 A | | 9/1980 | Lenhardt |
| 4,225,376 A | | 9/1980 | Berg |
| 4,416,719 A | * | 11/1983 | Horiuchi ................ 156/359 |
| 4,530,195 A | | 7/1985 | Leopold |
| 4,546,723 A | | 10/1985 | Leopold et al. |
| 4,628,582 A | | 12/1986 | Leopold |
| 4,726,875 A | | 2/1988 | Lenhardt |
| 4,820,365 A | | 4/1989 | Brumm et al. |
| 4,988,027 A | | 1/1991 | Bremner |
| 5,051,145 A | | 9/1991 | Lenhardt |
| 5,105,591 A | | 4/1992 | Leopold |
| 5,196,676 A | | 3/1993 | Hallahan |
| 5,295,292 A | | 3/1994 | Leopold |
| 5,313,761 A | | 5/1994 | Leopold |
| 5,322,586 A | * | 6/1994 | McLean ................ 156/358 |
| 5,361,476 A | | 11/1994 | Leopold |
| 5,567,261 A | | 10/1996 | Schoetz |
| 5,678,377 A | | 10/1997 | Leopold |
| 6,059,914 A | | 5/2000 | Suss |
| 6,100,537 A | | 8/2000 | Abraham et al. |
| 6,173,484 B1 | | 1/2001 | McGlinchy et al. |
| 6,244,012 B1 | | 6/2001 | McGlinchy et al. |
| 6,332,948 B1 | | 12/2001 | Lafond |
| 6,358,356 B1 | | 3/2002 | Bradshaw et al. |
| 6,389,782 B1 | | 5/2002 | Kinugawa et al. |
| 6,397,453 B1 | | 6/2002 | McGlinchy et al. |
| 6,438,819 B1 | | 8/2002 | McGlinchy et al. |
| 6,531,016 B1 | | 3/2003 | Weber et al. |
| 6,687,982 B2 | | 2/2004 | McGlinchy |
| 6,889,416 B2 | | 5/2005 | McGlinchy |
| 6,912,767 B2 | | 7/2005 | McGlinchy |
| 7,048,964 B2 | | 5/2006 | McGlinchy et al. |
| 7,296,381 B1 | | 11/2007 | McCabe et al. |
| 7,429,299 B2 | | 9/2008 | McGlinchy et al. |
| 2003/0205315 A1 | | 11/2003 | McGlinchy |
| 2008/0083193 A1 | | 4/2008 | McGlinchy et al. |
| 2011/0024019 A1 | | 2/2011 | Azzarello et al. |
| 2012/0037292 A1 | | 2/2012 | Williams et al. |

FOREIGN PATENT DOCUMENTS

| | | |
|---|---|---|
| EP | 2163398 | 9/2008 |
| RU | 592766 | 2/1978 |

OTHER PUBLICATIONS

International Search Report (9 pages) for PCT App. PCT/US10/43622, mailing date Sep. 16, 2010.
European Search Report (5 pages) for European Application No. 12163143.6, mailing date Jul. 20, 2012.

* cited by examiner

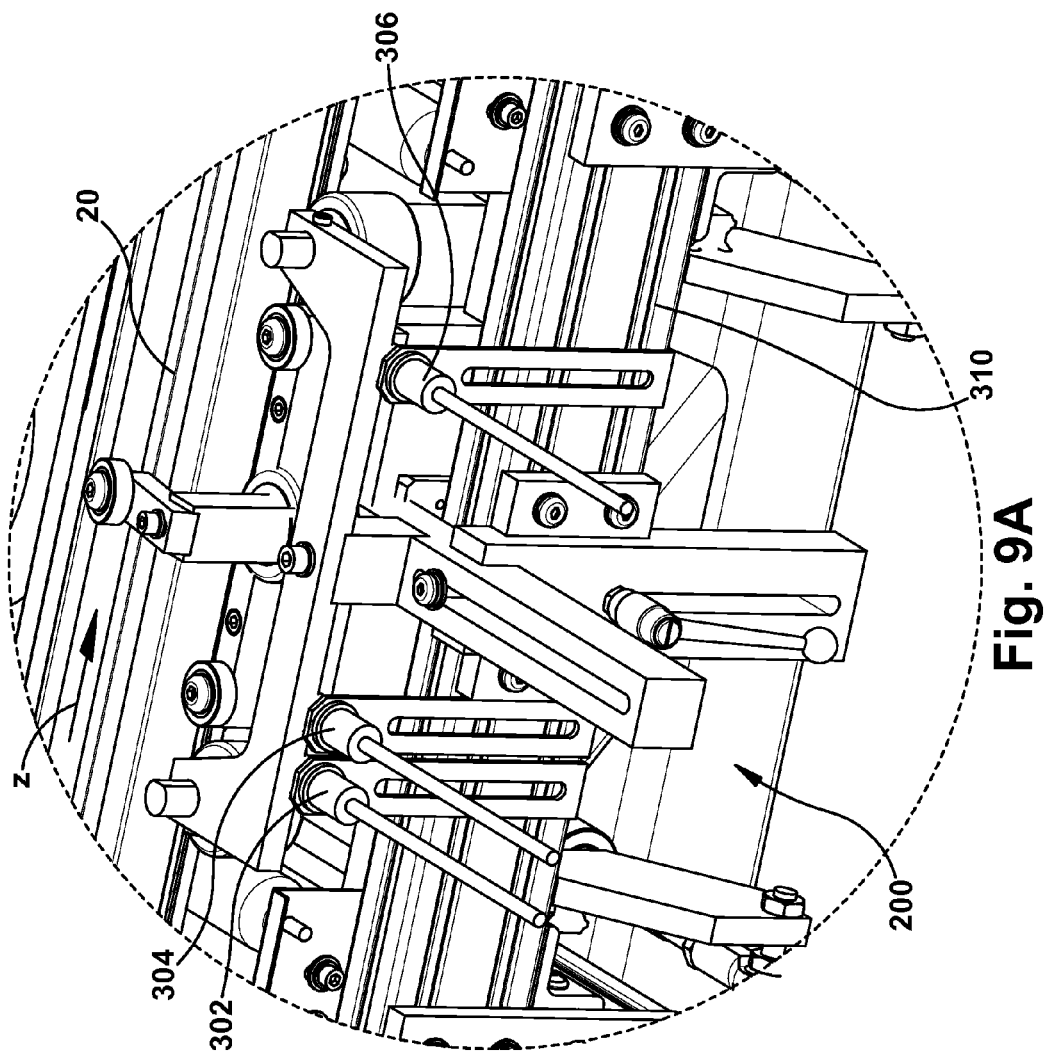

FLEXIBLE FILM HEATED ROLLER

CROSS REFERENCE TO RELATED APPLICATIONS

The present application claims priority from provisional U.S. Patent application Ser. No. 61/474,809, filed Apr. 13, 2011 entitled "Flexible Film Heated Roller" and incorporates by reference that pending application in its entirety.

FIELD OF THE DISCLOSURE

The present disclosure concerns decorative coatings for building components.

BACKGROUND

Components that make a window frame or sash are typically formed by miter cutting extruded components to size before heating the mitered ends and then pressing the heated ends together so that the melted ends bond to each other to form a four sided sash or frame. Further assembly of the window may involve installing an insulating glass "IG" unit into the sash or frame and possibly painting of the plastic that forms the sash or frame. Painting at this stage can be expensive, increasing the cost and delivery time of the window or door to the consumer. Decorative patterns can be applied to the window frame or sash prior to cutting of the component into pieces for assembly. These decorative patterns could either be a solid color or could simulate a wood grain finish.

One prior art machine, sold by CPS Resources of Indian Trail, N.C. 28079, routes substrates such as picture frames past a flexible film dispensing head. The speed of movement of the substrate matches the unwinding speed of the film as the film is brought into contact with the substrate. A combination of heat and pressure treatment of the film as it contacts the substrate causes the film to permanently adhere to the substrate. The present invention relates to improvements to this process especially as the process relates to application of decorative film to building products or components that have variable profile shapes.

The prior art device sold by CPS Resources has a resistive heat oven in the region of a rotating roller for heating a radially outer heat and pressure applying face of the roller. The heated face contacts film as the film is brought into contact with the component to be decorated. The prior CPS oven has an inner surface that surrounds a portion of the face of the roller and includes resistive heating elements that extend along the inner surface of the oven in an arc about the arcuate shaped face of the roller.

SUMMARY

The prior art roller heating oven and more particularly use of the resistive heating elements in the walls of the oven had certain disadvantages. In certain applications, the roller needs to be orientated at different angles with respect to the vertical. As the roller is reoriented from the vertical, the orientation of the roller's heated face also changes. As an illustrative example, for a window or door frame or sash member having a surface that is coated or decorated at an angle of forty five degrees, the roller's rotation axis is rotated by forty five degrees, and this reorients the heated face of the roller. Under these circumstances, the prior art oven can heat the roller in a non-uniform manner, resulting in an undesirable temperature gradient across the surface or face of the roller. One side of the face might be too hot, resulting in burning of the film, and the opposite side of the roller might be too cold, resulting in poor adhesion.

A second disadvantage with the prior art oven was the fact that the resistive heating elements took a long time to heat the roller to an adequate temperature. Set up of the system was delayed due to the fact that it took the oven 15 to 20 minutes to heat the roller up to a suitable operating temperature. Furthermore, the resistive heating elements stayed hot even after they were de-energized, as did the oven that supported those heating elements.

These disadvantages in operation are addressed by use of infrared heating elements in conjunction with an adaptive control method that takes into account the different parameters encountered when using a heat and pressure applying roller. One feature of the exemplary system uses infrared (IR) heaters located within the oven along the side of the roller. When energized in a controlled way these IR heaters produce better uniformity in temperature across the face of the roller.

An exemplary system can re-orient the face of the roller through an angle of 180 degrees (+/−90 with respect to the vertical) to allow a roller to apply controlled pressure and heat to a film moving between the roller and a treatment surface of the lineal. An exemplary controller automatically adjusts operation of the heaters and drive motors for positioning a roller head based on user input parameters that define a recipe. The recipe includes various parameters such as, the angle of the roller, the width of the roller, the contour of the roller, and the side to side position of the roller that is adjusted to decorate or treat a particular target surface of a elongated building component. Additionally, the controller allows the user to make modifications to the heater activation protocol based on perceived performance of the system.

These and other advantages and features of the disclosed system will become better understood by reference to the accompanying more detailed description, which is described in conjunction with the accompanying drawings.

BRIEF DESCRIPTION OF THE DRAWINGS

FIGS. 8, 9, 9A, and 10 are perspective views of a single workstation, illustrating a tape or film application zone or region in greater detail;

DETAILED DESCRIPTION

Figure 3:
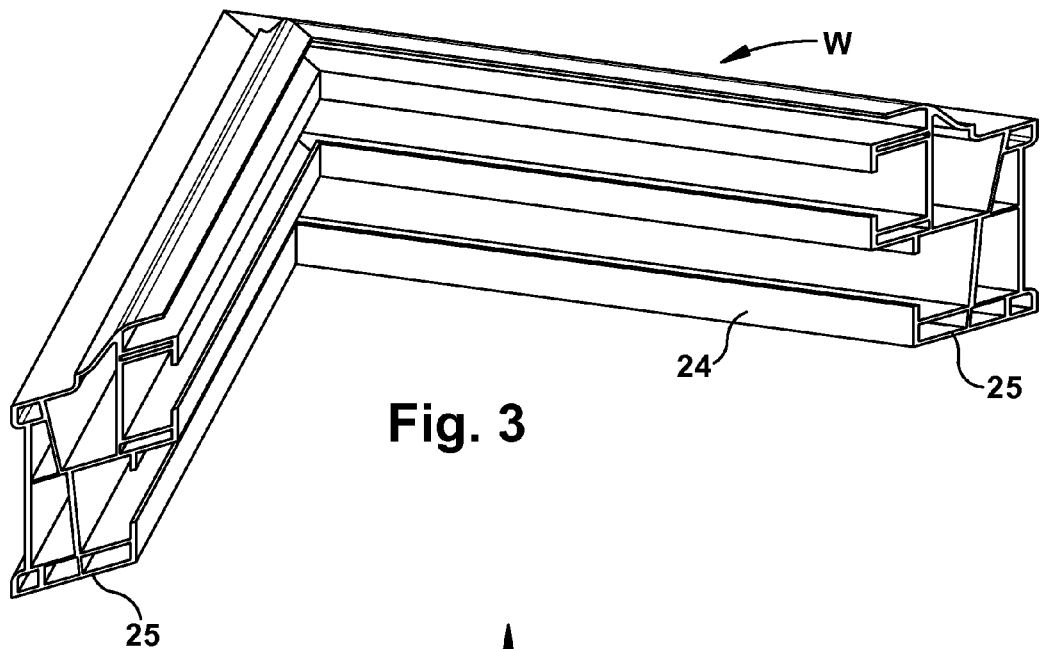
FIG. 3 is a perspective view of two abutting window parts that have been cut from a lineal and heat fused to form part of a window frame or sash.

The drawings depict an application system 10 for applying a transfer film or film coating to selected surfaces of a workpiece. In one exemplary embodiment, the workpiece is a lineal 20, which is cut into pieces which are then used to construct a window or door frame or sash. The system 10 applies a transfer film to multiple surfaces 22-25 (See FIG. 3a) of the elongated component, which is then cut and assembled into a window or door such as the window frame W shown in FIG. 3. Such components are referred to herein as elongated components or lineals.

Figure 1:
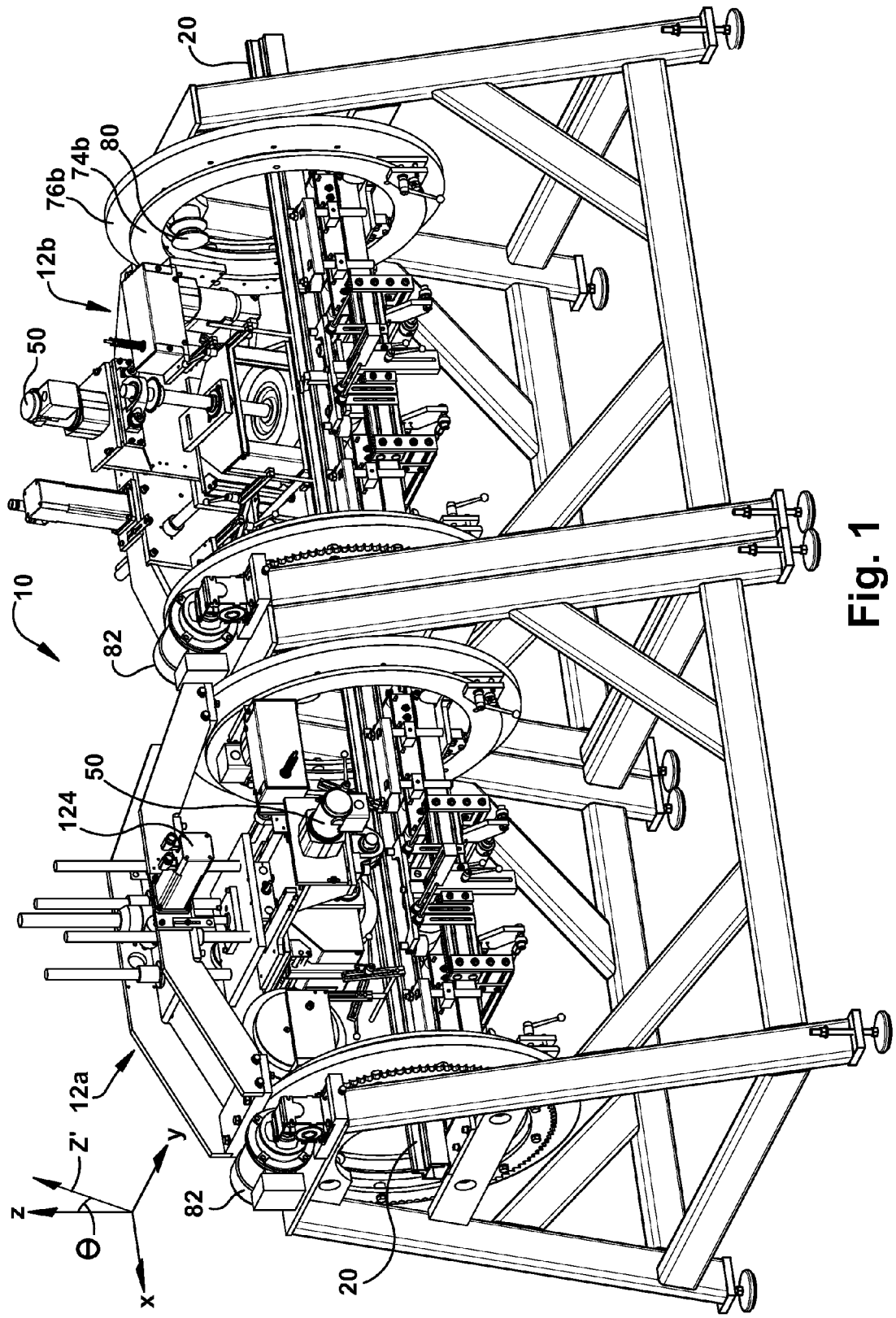
FIGS. 1 and 2 are perspective depictions of a film application system constructed in accordance with an exemplary embodiment of the invention.
Figure 2:
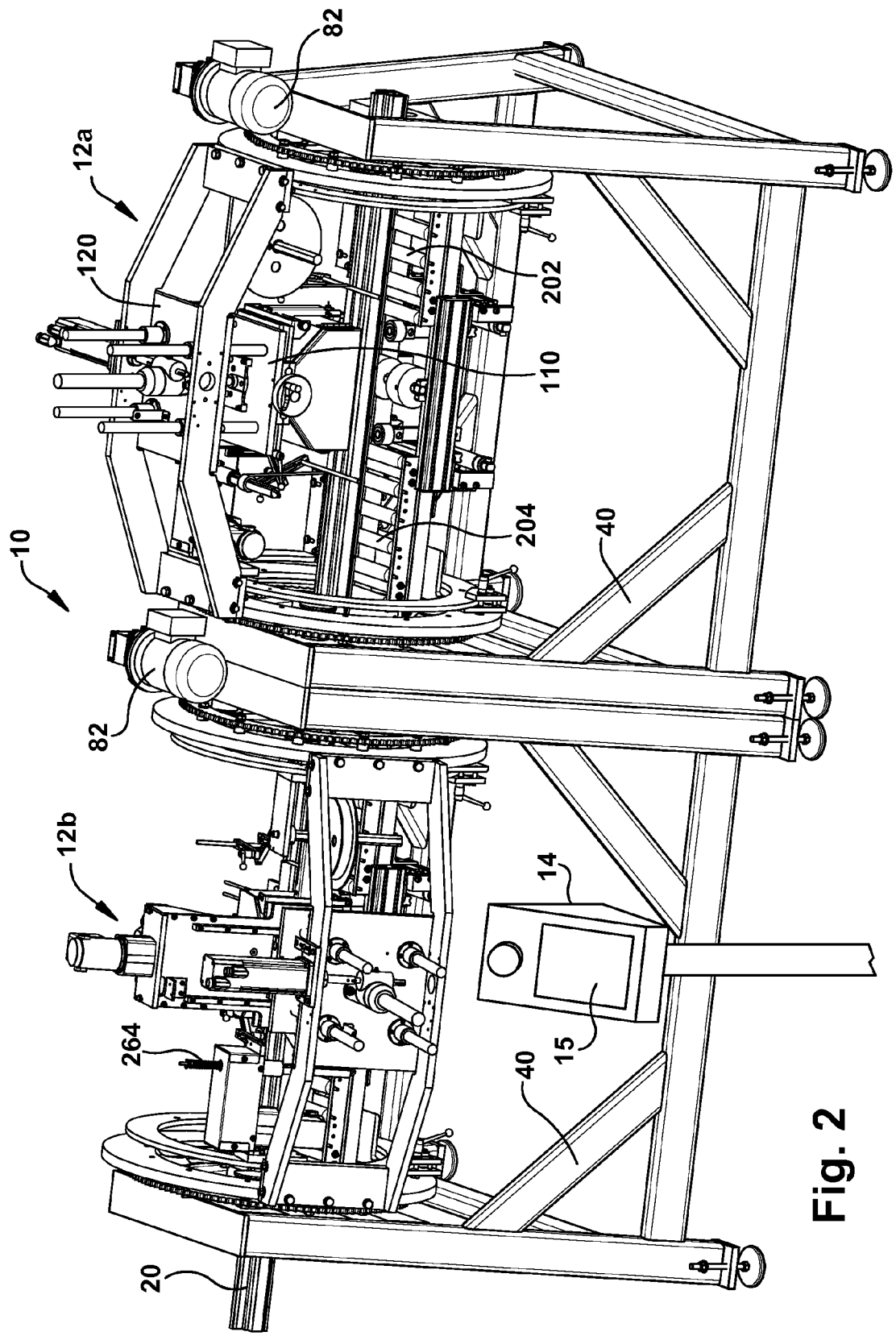
Figure 3A:
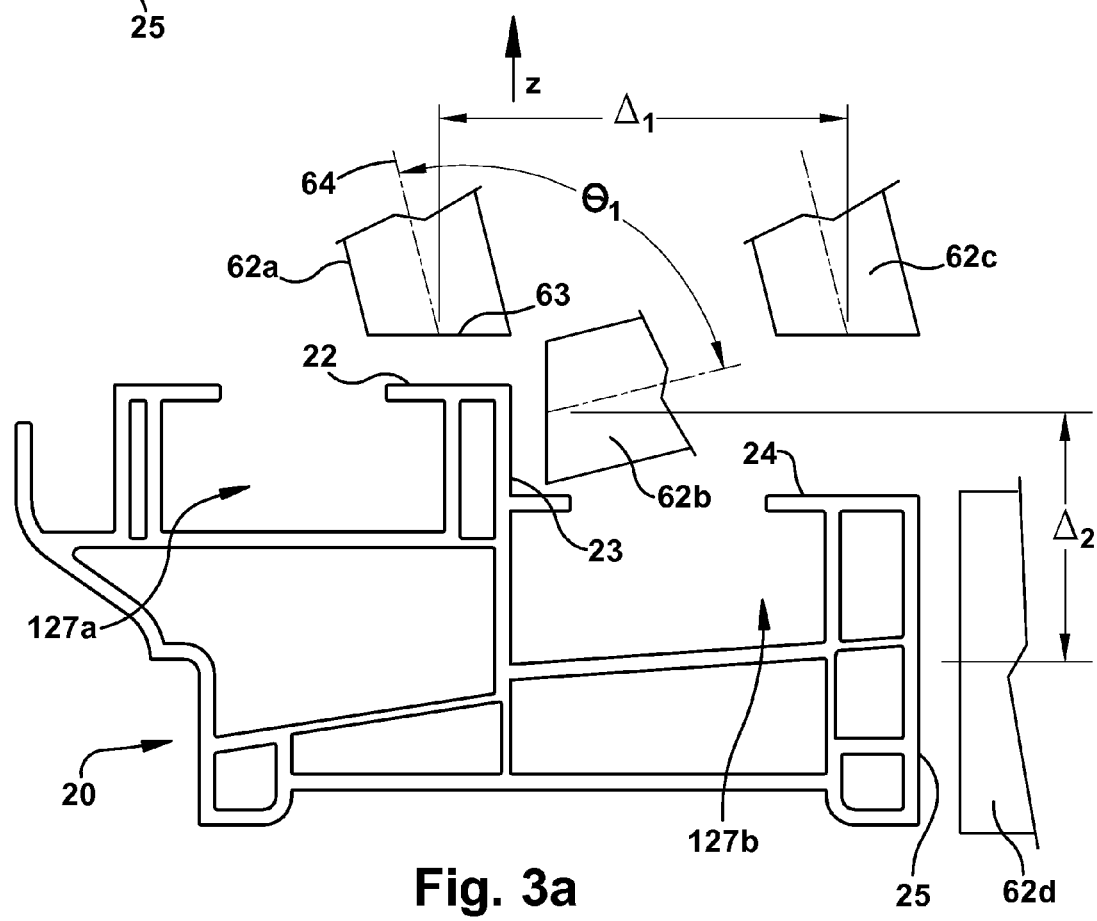
FIG. 3a is an end view of a component showing different surfaces to be treated by a transfer film.

One Exemplary system 10 includes multiple decorative transfer film application stations or work stations wherein each station applies a decorative transfer film to a different surface or region of the lineal. In FIGS. 1 and 2, two such stations 12a, 12b are depicted. Generally, each station applies a transfer film F (FIG. 8) to a specified exposed region of the elongated component so that each next subsequent station in a series of such stations covers a different exposed region until a desired portion of the lineal has been covered with the film F. Turning to FIG. 3a, for example, the surfaces 22-25, of the component 20 are covered with film F in one pass of the component or lineal through four different film applying workstations. An untreated lineal enters the first work station and all desired surfaces have been covered when the component or lineal leaves the last work station.

The multiple work stations operate under control of a control station 14. A programmable controller 300 (FIG. 12) at the control station 14 communicates with each of the work stations to control treatment of the lineal as it moves through the multiple work stations. An executable control program that runs at the control station 14 manages set up of the work stations to accommodate application of a specified width film to different surfaces of a lineal 20 having a specified profile at the different work stations. As discussed in more detail below, appropriate set up at each work station involves controlled movement of a transfer head 60 of the work station before the work station can accommodate a particular profile of lineal 20. As used throughout, the term "profile" means the cross sectional shape of the lineal 20 such as the shape of the end view of FIG. 3a. It should be appreciated by one skilled in the art that although only one profile is shown in FIG. 3a, a large number of different profiles may receive decorative films on specified surfaces.

Figure 4:
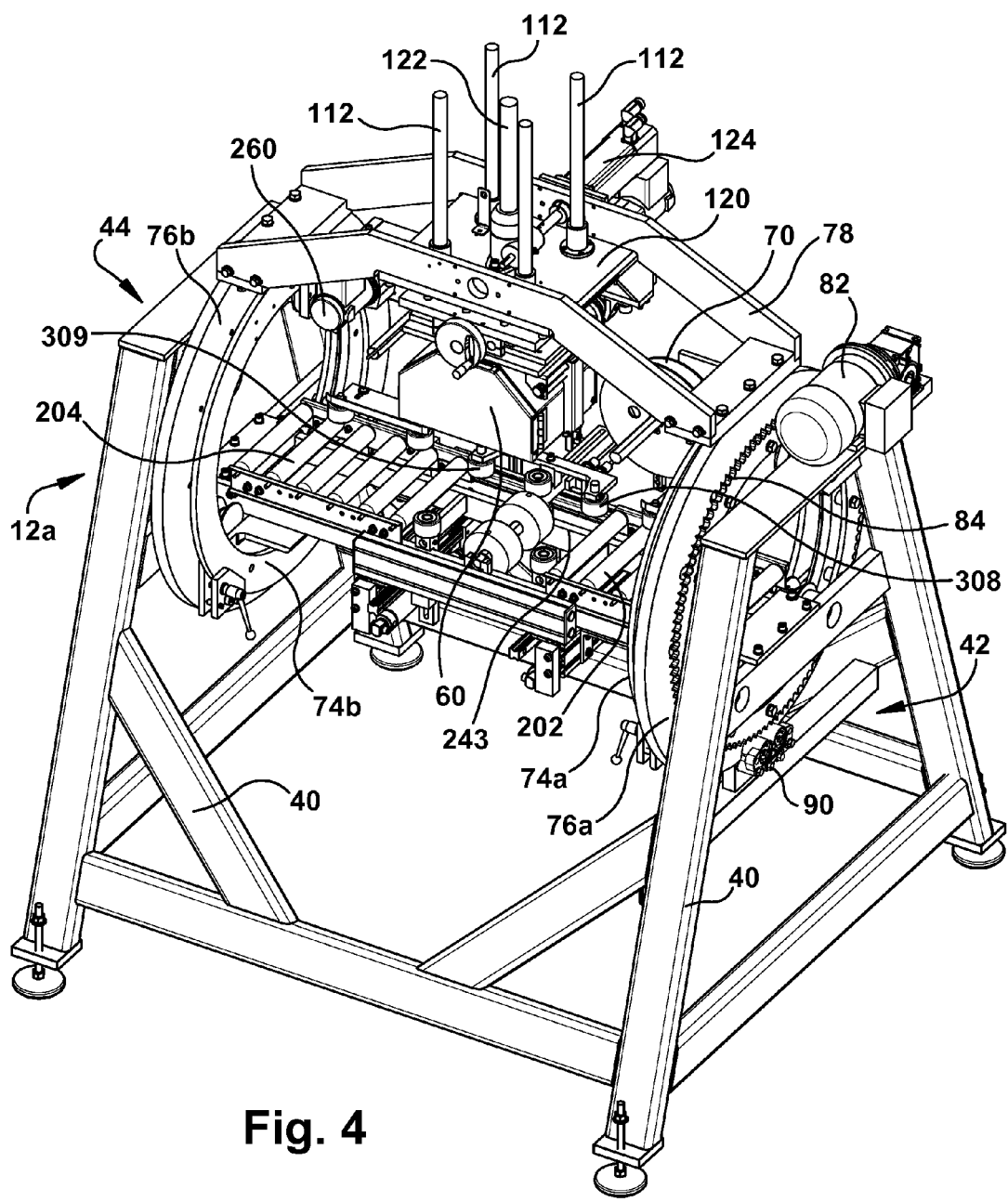
FIG. 4 is a perspective view of a single workstation for applying flexible film to an elongated component.

A single film application work station 12a is shown in FIG. 4 and is seen to include a support or stand 40 having an input side 42 and an output side 44. A drive 50 (FIG. 6) which in one exemplary embodiment is an electric motor moves successive lineals 20 (FIG. 2) along a generally linear path through the work station 12a from the input side to the output side as a thin layer of transfer film F is applied to a surface of the lineal. A transfer head 60 includes a rotatably mounted drive roll 62 (FIG. 5) coupled to the drive 50. In addition to moving the elongated component, the drive roll 62 applies heat and pressure to the transfer film F as the lineal 20 moves through the film application station 12a from the input side 42 to the output side 44. Motive force for moving the component or lineal is applied by the roll 62, but the roll does not directly contact the lineal due to the presence of the transfer film F between the drive roll and the lineal.

The exemplary film material is an elongated multi-layer plastic film wherein one layer of the multilayer material typically a decorative layer and a second layer is a backing layer B that is recoiled after application of the decorative layer to the lineal 20. Additional formulations of the film include a cover layer and possibly a separate adhesive layer for fixing the decorative layer to the lineal 20. In a typical operation application of heat and pressure to the film F as the film contacts the lineal causes the decorative layer to bond to the lineal and the backing material separates from the cover layer (if present) and is wound about a takeup roll. Suitable films F for use with the exemplary embodiment of the invention are commercially available from GED Integrated Solutions, Inc., assignee of the present invention.

Lineals 20 are extruded with a variety of different cross sectional shapes or profiles. Each of the multiple work stations e.g. 12a and 12b utilizes a backing or support fixture that is specifically designed to support the profile of a specific lineal as the lineal moves through the work station past the transfer head 60 and its drive roll 62. A typical lineal 20 can be over 20 feet in length and multiple pieces are cut from such a lineal to form the window after the material or film F is applied. A spacing between successive drive rolls 62 at two adjacent, successive workstations is less than the length of the lineal. Therefore, before the trailing edge of a lineal moves out of driving engagement with one drive roll 62 (at a first workstation for example) it's leading edge passes or drivingly engages a downstream roll 62 at a next subsequent film application workstation. A transmission between an output of the drive 50 and the roller 62 includes a slip clutch. Use of such a clutch allows the motors of the two (or more) drives 50 to rotate at slightly different speeds so that the fastest motor determines speed of movement of the lineal.

At different transfer or work stations, the transfer head 60 applies film from different angles with respect to a center axis of component movement through the system 10. The control station 14 includes a touch sensitive input screen 15 that transmits signals to the programmable controller 300 and allows a user or operator to choose a component profile from a menu of such profiles (See FIG. 12). Examples of the head 60 (and its associated roller 62) approaching the lineal 20 from different angles are illustrated by reference to FIG. 3a. A surface 22 of the elongated component is covered at a first of multiple successive stations using roller 62a (See FIG. 3a) having a beveled outer surface 63. If the surface 22 is generally parallel to a floor on which the workstation stand 40 rests, the angular spacing or offset of a centerline 64 to the vertical (x axis in FIG. 3a) is less than 15 degrees. The beveled surface 63 of the drive roll 62a contacts a generally flat surface 22 (with the film F interposed therebetween).

A similarly configured roller 62b is used (at a downstream application station) to treat the surface 23 which is seen to be oriented at a right angle with respect to the surface 22. An angle $\Theta_1$ between the centerline 64 of the rollers at these two film decoration stations is ninety degrees. Two other different configuration rollers 62c, 62d for treating the surfaces 24, 25 are depicted in FIG. 3a and these rollers 62c, 62d would be positioned at two additional downstream stations in the system 10. During set up of the system, the user chooses an appropriate drive roller from an inventory of such rolls. The drive roller is keyed and mounts to a correspondingly keyed shaft. The shaft also supports two collars (not shown) which limit side to side movement of the drive roller along the length of the shaft after the roller is properly positioned on the shaft.

In describing the operation of the various components of the film application stations (e.g. 12a and 12b), it is useful to define a co-ordinate system such as the co-ordinate system shown in FIG. 1 fixed to the transfer head 60. The path of travel of the elongated component is along the x direction from an origin of the co-ordinate system. A distance in a radial direction from the x axis of this system is designated as a distance z. Finally, the angular position of a location with respect to the a vertical (perpendicular to the floor the stand 40 rests upon) is referred to by an angle theta $\Theta$. As depicted in FIG. 1, when the head rotates about the x axis, the z co-ordinate rotates to a new orientation (z') so that the z direction always indicates a radial (or in and out) position of the head with respect to an origin.

Controlling the Angle of Tape or Film Application

Figure 7:
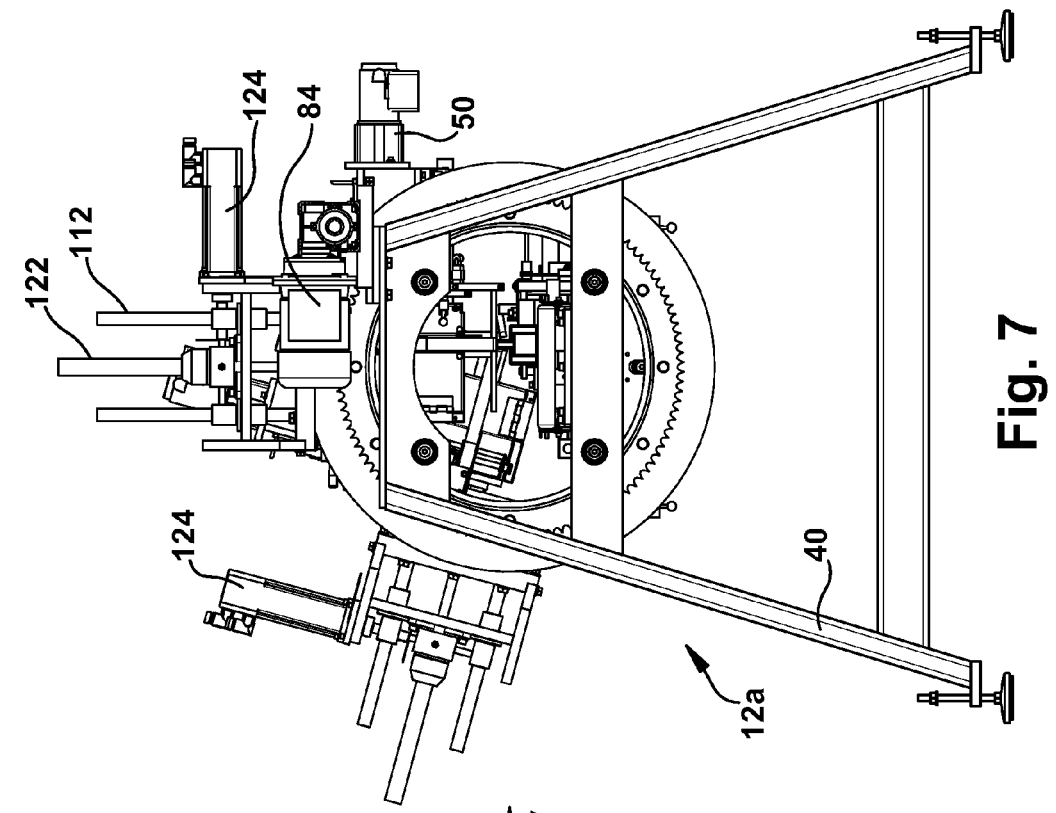
FIGS. 6 and 7 are enlarged end views of the two successive workstations for sequential treatment of elongated window parts.
Figure 10:
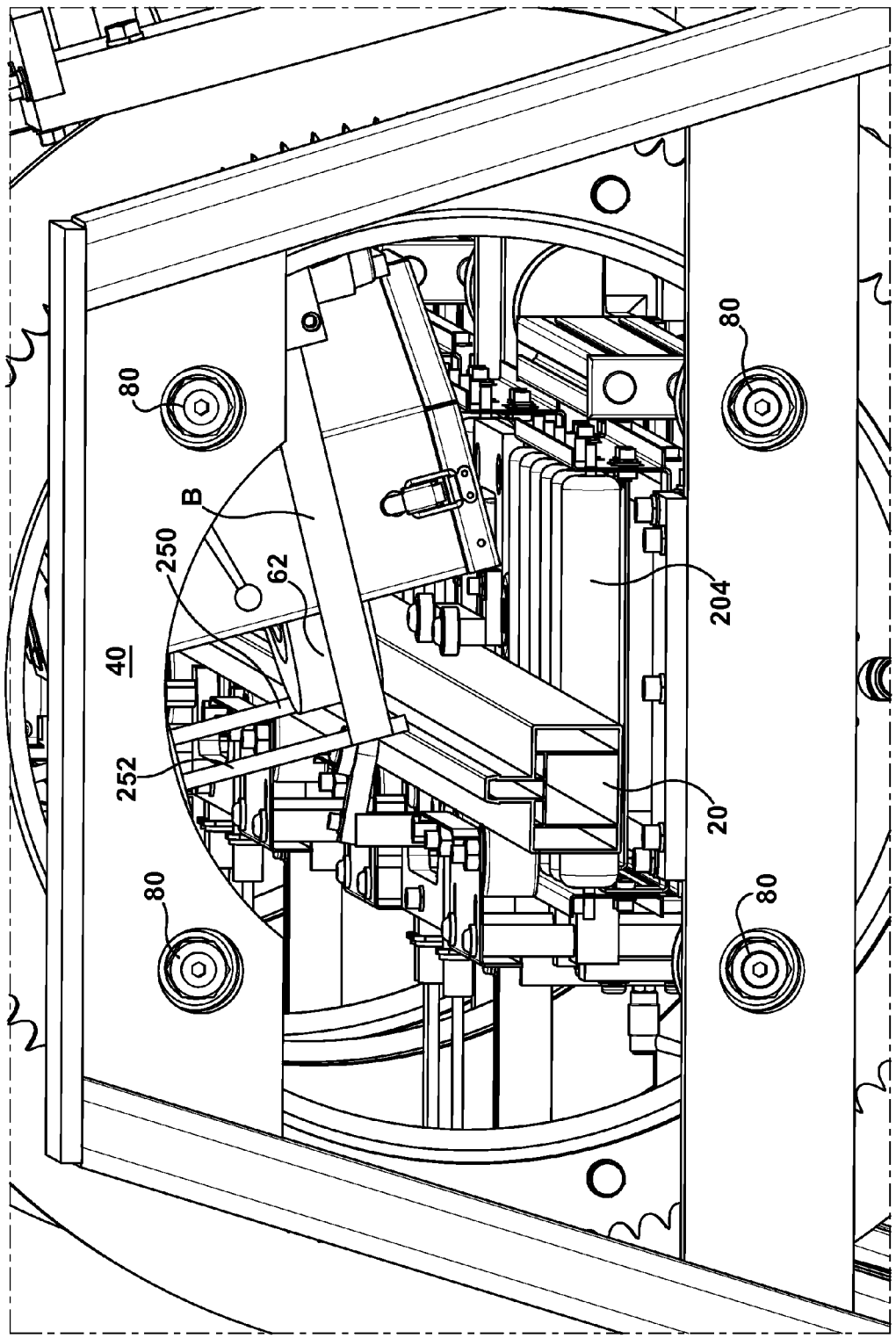

In one exemplary embodiment, a dispensing roll 70 and a take-up roll 72 are mounted to first and second rotatably mounted rings 74a, 74b. (See FIG. 5) The dispensing roll 70 is mounted to a ring 74a on the input side 42 of the workstation and the take up roll is mounted to a ring 74b on the downstream or exit side 44 of the workstation. The transfer head 60 (including its pressure backing roll 62) is mounted to a cross piece 78 (FIG. 4) that extends between two larger support rings 76a, 76b rotatably supported by the stand at an input and an output of the workstation (See FIG. 4). The rings 76a, 76b are mounted to the stand 40 by means for four spaced apart cam followers 80 (See FIG. 10). A drive motor 82 supported by the stand 40 rotates the rings 76a, 76b (under control of the controller 300) to orient the transfer head 76 with respect to the path of travel the lineal follows along the z axis. As an example, the head 60 has been oriented at two different orientations spaced by an angle $\Theta_2$ at two successive work stations in the end view of FIGS. 6 and 7. The presently preferred drive motor 82 is an a.c electric motor having an output shaft that rotates a drive belt (not shown), which engages a circumferencially extending gear 84 connected to the ring 76a. Use of a servo drive motor is a possible alternate motor for use with the disclosed system for controllably rotating the support rings 76a, 76b. Due to the rigid coupling together of the rings 76a, 76b by the cross piece 78 the rings 76a, 76b rotate together whenever the motor 82 is energized.

During set up of the film application system 10, the controller 300 instructs the operator regarding relative positioning of the smaller, inner rings 74a, 74b relative to the outer support rings 76a, 76b. In many applications, the rings 74a, 74b are oriented so that the film unwinds from the supply, passes into engagement with the roller 62 and the backing is rewound all within the same plane as the roller 62 with no angular offset. Other set ups for different component or lineal profiles require relative angular offset of one or both of the supply 70 and take up 72 rolls with respect to the head 60 and its drive roller 62. This angular offset of the coil and roll can be up to 45 degrees. In one exemplary set up, the transfer head is oriented directly above the lineal passing through the work station and both the ring 74a on the input side supporting the dispensing or supply roll 70 and the ring 74b on the output side supporting the take up roll 72 are rotated in a counter-clockwise sense as seen in FIG. 4 by an angle of 30 degrees.

To re-orient (if needed) the rings 74a, 74b (and attached rolls 70, 72) with respect to their support rings 76a, 76b the user releases a brake 85 comprising a plate carried by the ring 76a (for example) by loosening a lever arm 86 which lessens the frictional contact between the brake and the ring 74a (for example). The inner rings 74a, 74b are mounted to their respective outer rings 76a, 76b by bearings which allow relative rotation of the ring 74a (for example) with respect to the ring 76a. Once an appropriate angular offset is set by a user rotating the ring 74a, for example, the user retightens the brake 85. Note, in one orientation wherein the rolls and drive roller are essentially co-planer (most common) a pin slips into aligned holes on the rings 76a, 74a (not shown) to supplement the action of the brake 85. In all situations, the rings 74a, 74b are fixed in relation to their respective support rings 76a, 76b when the motor 82 is actuated to rotate the head 60. In one exemplary embodiment, the system 10 has a automatic brake 90 supported by the stand 40 for stopping the rotation of the ring 76a in response to the controller 300 to lock the rings 76a, 76b in relation to the stand once they have been properly oriented during set up of the system. The exemplary brake 90 is a commercially available brake having a pneumatically actuated brake shoe and is sold by Talamatic.

Radial in and Out Movement of the Transfer Head

The transfer head 60 is mounted to a generally planar support plate 110 (FIG. 5) for radial movement in and out along the z axis. The plate 110 is coupled to four linear shafts 112, which pass through bearings supported by a plate 120 (FIG. 2) secured by the cross piece 78 at a fixed distance from the lineal path of travel though the work station. In and out radial movement of the transfer head is achieved by changing a separation of the two plates 110, 120 indicated by the arrow 121 in FIG. 5.

Mounted to the radially fixed plate 120 is a linear actuator in the form of a mechanical ball screw jack 122 that connects to the support plate 110 for moving it radially in and out. An electric motor 124 has an output coupled by means of an alignment coupling 125 (FIG. 19) to the screw jack 122 for relative radial movement of the support plate 110 with respect to the radially fixed plate 120. The distance separation between the two plates 110, 120 is varied by an appropriate controller 300a, 300b etc. depending on the profile of the lineal 20. The controller 300 maintains a database that includes a correct distance or separation for each of the transfer heads of the multiple workstations so that for a given lineal 20 the setup of this spacing is accomplished in an automated fashion by sending appropriate energization signals to the various motors for controlled radial positioning of the respective heads at the different stations.

At a bottom or furthest extent of its travel, the motor 124 causes the roller to compress slightly and thereby exert a controlled pressure against the lineal. During set up of the workstation, an operator actuates a touch screen to cause the motor 124 to move the roller (rotating about its axis of rotation) until the roller contacts a lineal (often a stub lineal much shorter than the length of lineal passing through the workstation during production) until the roller exerts enough pressure to move the lineal away from its set up position. This position of the head is used as a reference position for precision positioning of the roller during production.

A distance variable is programmed into the controller for use during production that move the roller an additional distance beyond this reference position. Positioning at this slightly greater distance than the reference position cases the roller to exert a controlled pressure against the lineal as film moves between the lineal and the roller. This precise pressure control in combination with controlled heating of the roller by the heaters achieves good adhesion between the film and the lineal for a variety of different shaped lineals and angles between the roller and the target surface for a given work station. In one working example this distance can vary from between −½ (min) and 8 (max) inches.

The preferred example system uses a three phase synchronous motor 124 for controlling the radial position of the roller.

A suitable motor is available from B&R Motor having a place of business at 1250 Northmeadow Parkway, S-100, Roswell, Ga., 30076 under part number 8LSA3. A data sheet for the motor entitled "8LS Three-phase Synchronous Motors User's Manual V1.1" is incorporated herein by reference. The motor has a rotary encoder which is used to precisely position the roller. An example ball screw jack 122 is available from Nook Industries, having a place of business at 4950 East 49th Street, Cleveland, Ohio 44125 under part number 1-BSJ-I 5:/SSE-1/SSE-2/FP/9/M1. Signals from the motor encoder are correlated with linear movement of the plate due to the drive action of the ball screw jack. During calibration, the known position of the roller at which the lineal is driven away from its stationary position at the workstation corresponds to a given rotary encoder output that is feed back to the workstation controller to implement a closed loop control over the position of the head. The controller energizes the motor so that a slightly different encoder output is produced to apply the requisite additional pressure during production.

Side to Side Movement of the Transfer Head.

The drive roll 62 is mounted for rotation about an axis 126 (See FIG. 8) transverse to the z axis and which changes depending on what surface of the lineal is to be treated with film. In some applications, it is necessary to move the tangential position of the roll 62 along the axis 126 to different positions at different workstations. This need is illustrated in the schematic depiction of FIG. 3a, which shows a lineal suitable for fabrication into a double hung window frame supporting two sashes in gaps or channels 127a, 127b. Consider the two pressure rollers 62a, 62c depicted in FIG. 3a. The first roller 62a presses the film F against a generally planar surface 22 of the lineal 20 and has a beveled outer surface for pressing the film against that surface. Now consider the roller 62c. This roll (supported at a different work station from the roller 62a) also has a beveled surface for pressing the film against a conforming surface 24 of the lineal 20. An axis of rotation for the two rollers 62a, 62c are similarly oriented as determined by the angular rotation of the head about the z axis. The plane in which the two rollers 62a, 62c rotate, however, is offset by a distance delta $\Delta_1$. This offset is achieved by moving one of the rolls 62c, 62d with respect to a nominal position for the roller. In a similar way, it is seen that the plane of rotation of the two rollers 62b, 62d are offset by a distance $\Delta_2$. (Note, these two rollers also indicate the need for an different angular offset of the transfer head for different treatment surfaces).

Figure 5:
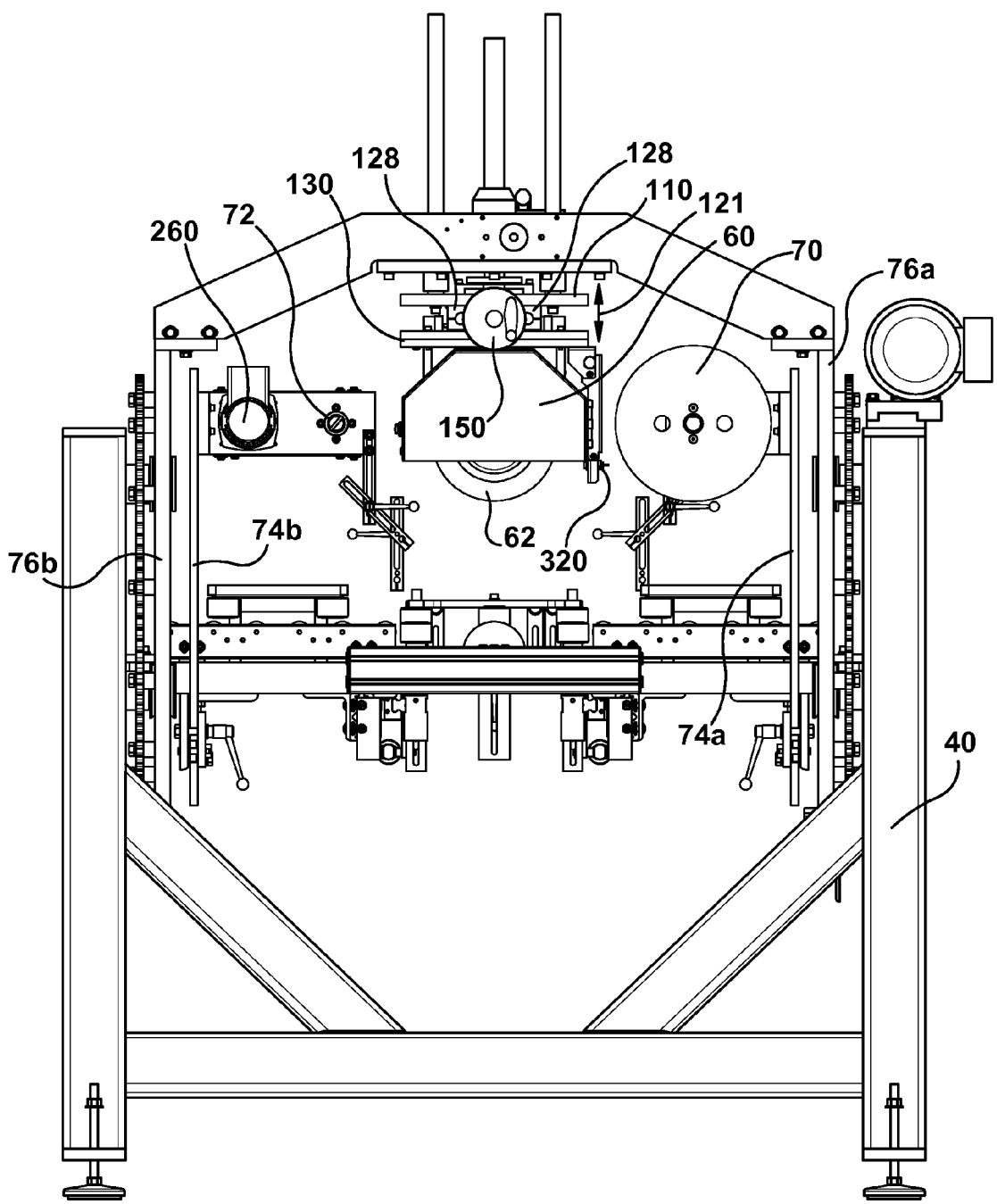
FIG. 5 is an enlarged side view of the workstation of FIG. 4.
Figure 6:
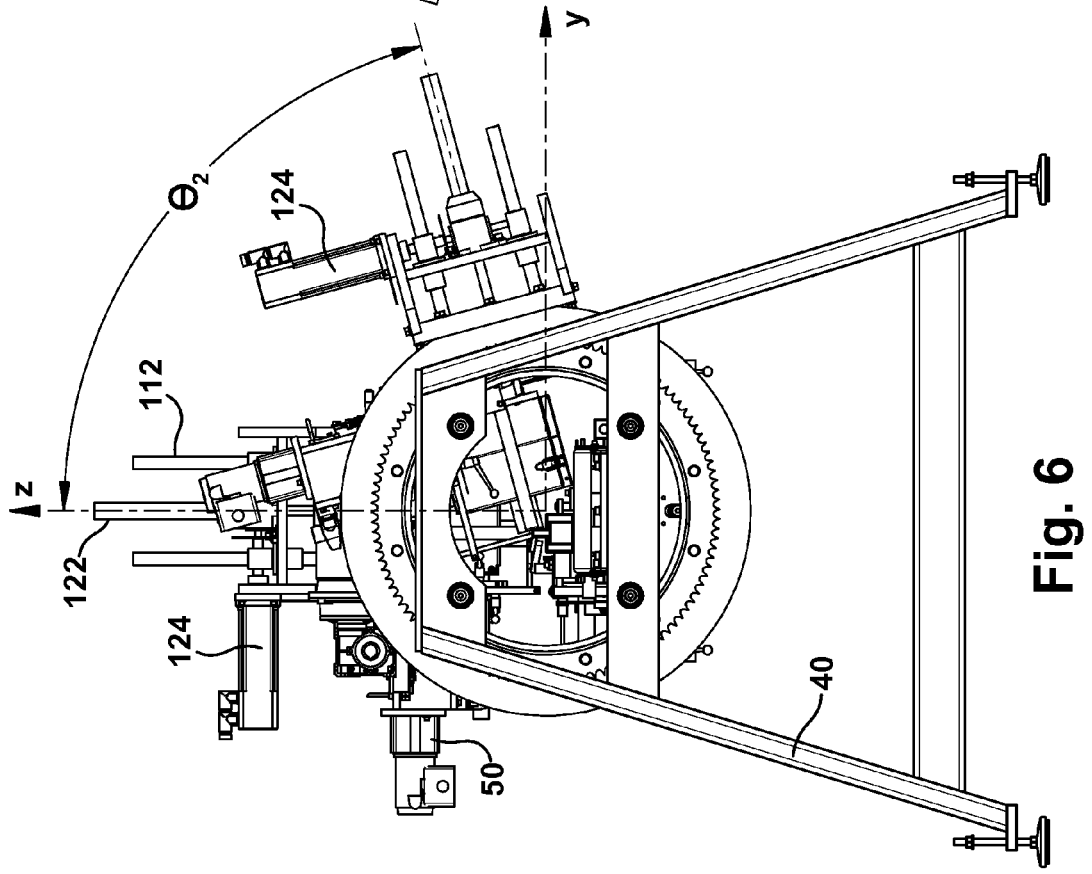
Figure 9:
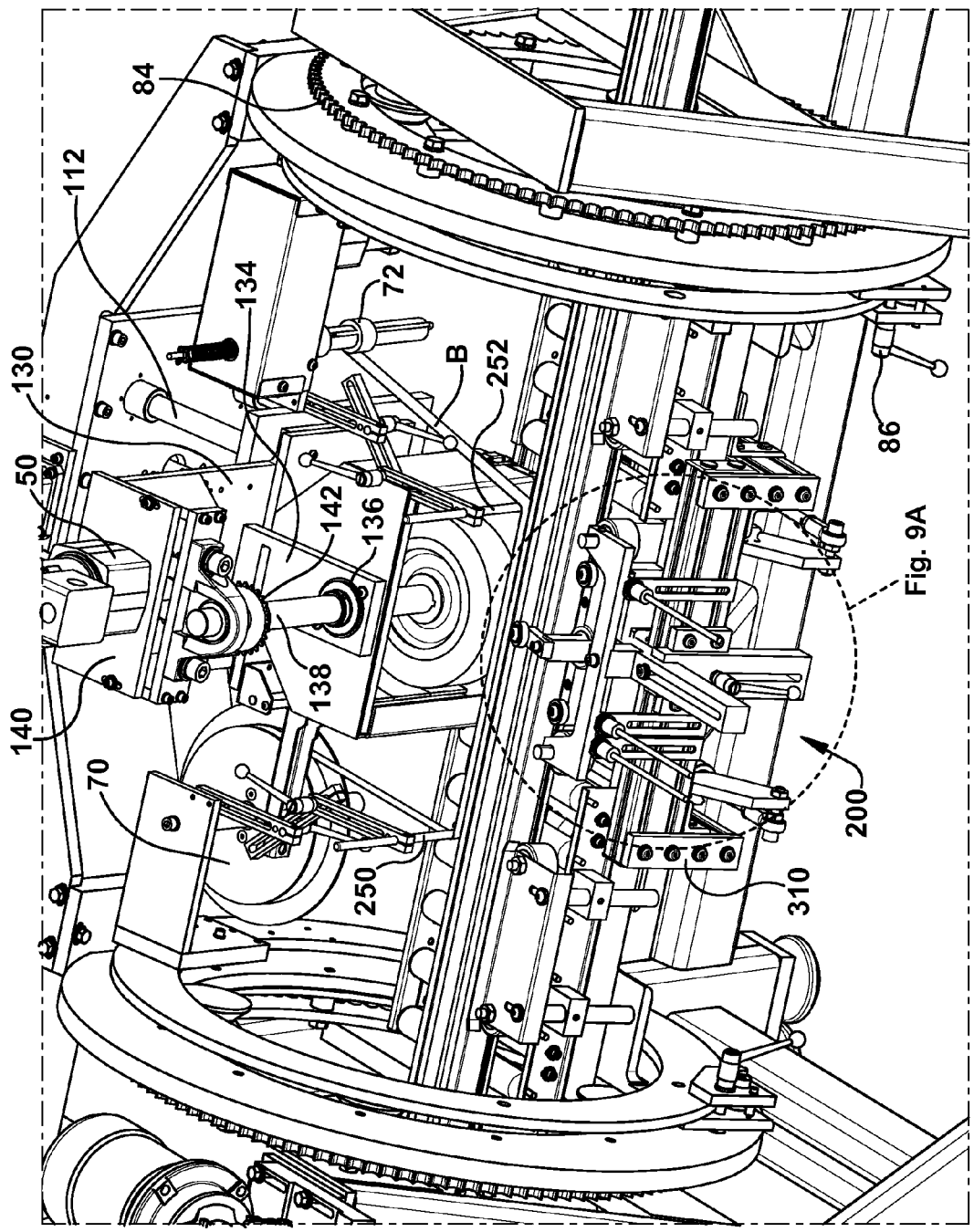

To achieve such side shifting of the roll, the plate 110 includes two side by side linear rails or bearings 128 that support an insulating plate 130 supported by those bearings (See FIG. 5). The plate 130 moves in a linear path with respect to the plate 110. As seen in the Figures, a housing or oven 132 partially encloses the roller 62. A flange 134 supports a bearing 136, which supports a roller drive shaft 138 for rotation. During set up of a workstation, an appropriately configured roller 62 (in a preferred embodiment constructed from silicone) for a particular lineal having a particular profile is attached to the roller drive shaft 138. A motor mounting plate 140 is coupled to the plate 130 and supports the drive motor 50. An output shaft (not shown) of the motor is coupled by means of a drive belt to a gear 142 attached to the roller drive shaft, as shown in FIG. 9.

In the present example, side shifting of the oven 132, roller 62 and drive 50 is achieved by a user rotating a manual crank 150. Rotation of the crank in one sense moves the roller 62 in one direction and rotation in an opposite sense moves the roller in an opposite direction. In the exemplary embodiment the hand crank 150 (FIG. 14) is coupled to a ball screw drive having acme threads. In an alternate example embodiment, side shifting is achieved by a motor/servo drive directed by the controller 300.

Backing Fixtures

The enlarged depictions of FIGS. 8, 9, 9A, and 10 illustrate a film transfer zone or region 200. The film F and the elongated component or lineal 20 enter this zone and come in contact with each other as the roll 62 applies pressure and heat to transfer a decorative layer of the film F to a surface of the lineal 20. Before making contact with the film F in the transfer zone, the lineal 20 is supported by a series of parallel, generally horizontal entrance rolls 202. After transfer of the decorative layer to an appropriate surface of the lineal 20, the lineal is supported by a series of parallel, generally horizontal exit rolls 204. In between these rolls, in a region of transfer each workstation includes a specially configured backing fixture.

Figure 11A:
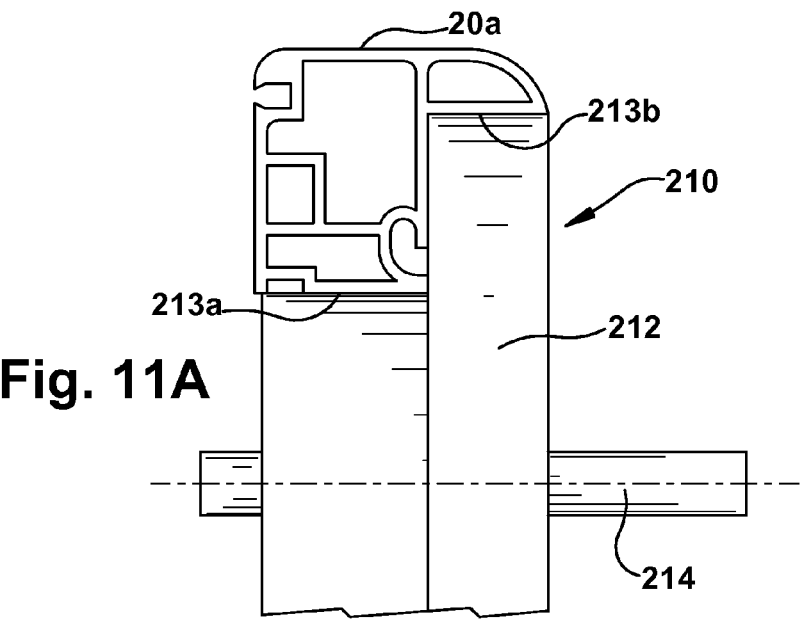
FIGS. 11A and 11B are schematic depictions showing alternate backing fixtures for use with different configuration profiles of the elongated window or door components.
Figure 11B:
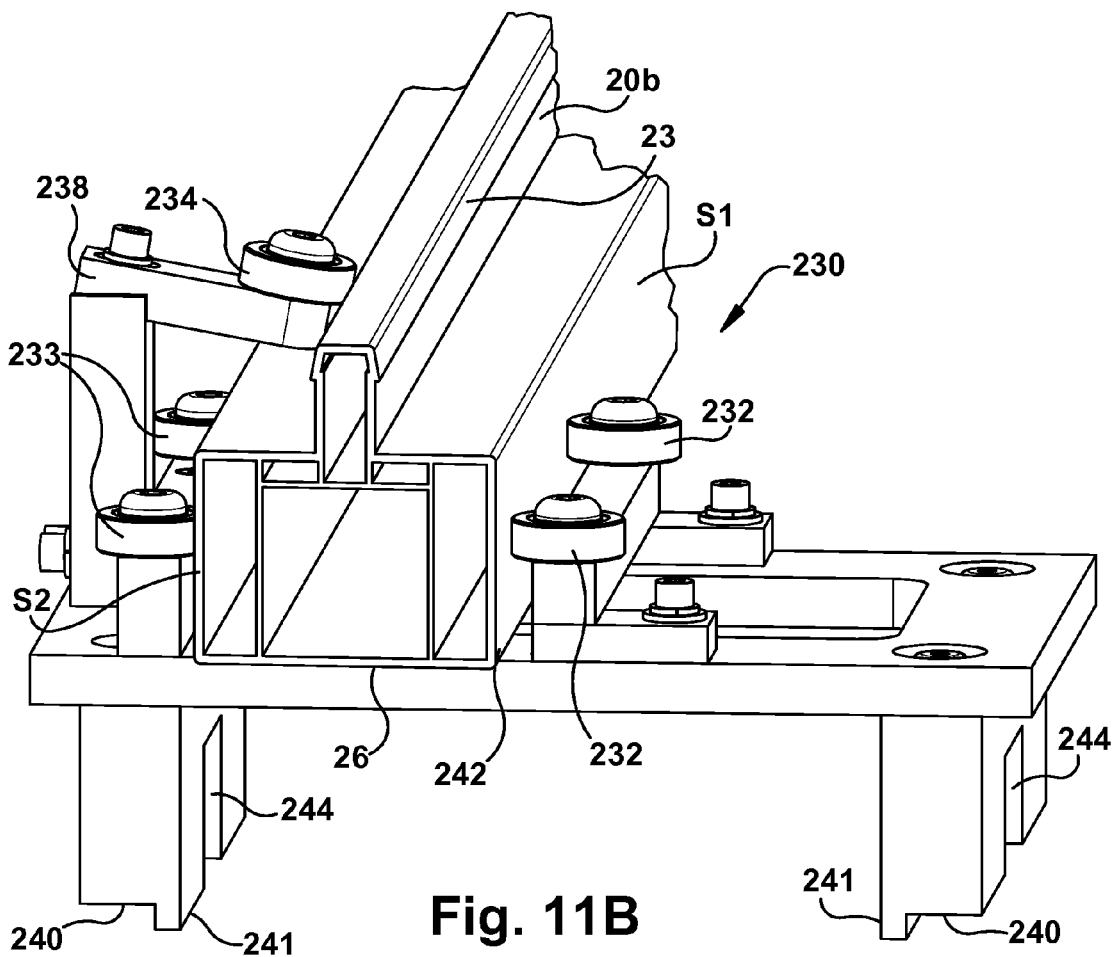

The exemplary system 10 can accommodate many different configuration lineal profiles. FIGS. 11A and 11B depict two end views of lineals 20a, 20b having different shapes. In addition to requiring different configuration rollers 62, the variety of different shaped lineals must be adequately supported and guided in the transfer region 200 as film is pressed against a surface of the lineal to be treated. FIGS. 11A and 11B depict two different backing fixtures 210, 230 that support and guide the lineals 20a, 20b. Note, each of the multiple stations 12a, 12b etc through which the lineal moves has its own backing fixture, which are not necessarily the same from one work station to the next.

A first backing fixture 210 (FIG. 11A) includes a stepped backing roll 212 having two different diameter outer lineal support surfaces 213a, 213b. The stepped roll 212 is coupled to an axle 214 having a length to fit in and be rotatably supported by trunnion bearings 220 (FIG. 8) mounted to the stand 40 on opposite sides of the transfer region or zone 200. During set up of the workstation, the controller 300 displays to the user a number (perhaps hundreds) of lineals by a designation and then prompts a user to select from an inventory of backing fixtures and rollers 62 so that an appropriate combination of roller and backing fixture is used at each work station 12a, 12b etc. In an instance in which the fixture 210 of FIG. 11A is appropriate, the user fits the axle 214 into the bearings 220 so that the desired lineal of the many possible profiles can pass through the zone 200 in contact with the backing fixture in a manner depicted in FIG. 11A.

The backing fixture 230 (FIG. 11B) is specially configured for a lineal 20b having a flat surface 26 spaced away from the roller 62. The lineal 20b enters the zone 200 supported by the entrance rolls 202 and passes through the backing fixture 230 and in particular passes over two flat support surfaces 242 of the fixture that define a spacing to appropriately position a top of the lineal for contact with the pressure roller 62. A first pair of sidewall guide rollers 232 engage one side wall S1 of the lineal and an opposite pair of side guide rollers 233 engage an opposite side wall S2 of the lineal. An additional guide roller 234 engages a surface of the lineal from one side. The side to side spacing of the guide rollers 232, 233 is adjustable so that the fixture can accommodate different width lineals. The angle of an arm 238 that supports the roller 234 is also adjustable to contact the lineal at different angles.

During set up, the fixture 230 is placed by an operator into a rectangular gap or space between the entrance and exit rollers 202, 204. Four guides 241 fit down into this gap so that four downwardly facing surfaces 240 of the fixture abut a perimetrically extending rectangular border or ledge 243 that surrounds the rectangular gap and which is defined by the stand 40. (See FIG. 4) The position along the z axis of the fixture is determined by two notches 244 formed in the guides that have a width that fits over the mounting block that holds trunnion bearings 220 on opposite sides of the lineal path of travel, thus keying the fixture into position. No special tools are need for either of the fixtures 210, 230. The user lifts an existing fixture out of the way, obtains an appropriate next fixture from a stock or inventory of such fixtures and slips it into place by placing a support axle 214 into the trunion 220 or slipping the fixture into a keyed position defined by the notch 244.

Film Guides

Figure 8:
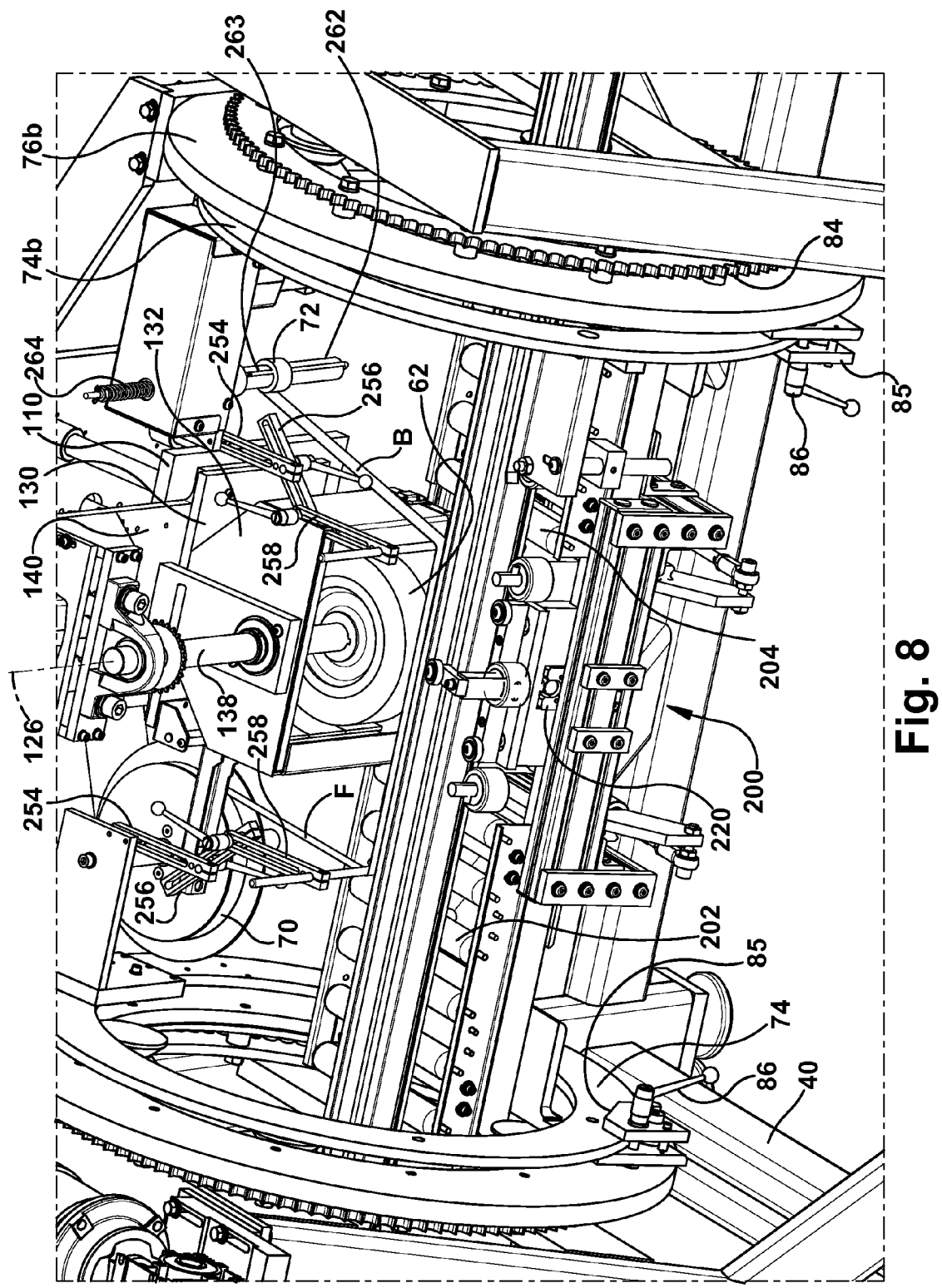

As depicted most clearly in FIGS. 8 and 9, the film F is routed from the supply roll 70 to the takeup roll 72 and through the transfer zone by elongated guide shafts 250, 252 (FIG. 9) properly angled and positioned with respect to the roller 62. Before the roller 62 is moved radially into contact with the film, these shafts 250, 252 guide the film F in a path through the transfer zone. An entrance guide shaft 250 is positioned to divert the film F in its path from the supply roll and allow the backing B to pass over the second or exit guide shaft 252. During set up of the workstation, a user or operator positions the guide shafts by proper positioning of three clamps 254, 256, 258 that are supported by an appropriate one of the two rings 74a, 74b. Proper set up results in the film passing along a path that is generally parallel to the surface which the decorative layer of the film F is designed to treat once the lineal is pushed into the transfer zone. As the lineal 20 approaches the transfer zone, the motor 124 is actuated to bring the roller into engagement with the film. Once the film is trapped between the roller 62 and the lineal the frictional engagement causes the film to unwind from the supply. As the lineal moves through the transfers region, the take up roll 72 is rotated by a motor 260 coupled to a spindle 262 that supports the takeup roll. The spindle 262 supports an elongated clamp 263 extending along its length to allow an end of the backing layer B to be secured to the shaft or spindle 262 and hand wound a sufficient amount to connect the film to the take up roll. When not rotated by the motor 260, a spring tensioner 264 maintains tension in the backing material.

Sensors

The controller 300 (FIG. 12) at the control station 14 monitors a number of different sensor inputs and controls a status of a number of different motors during operation of the system 10. Multiple optical sensors 302, 304, 306 are mounted to a fence 310 for monitoring a presence or absence of a lineal at the transfer zone. Another sensor 320 monitors the temperature of the roller 62. During startup of the treatment of a succession of multiple lineals, a user or operator inserts a first lineal into a first workstation such as the station 12a. The appropriate position of the lineal is clear to the user due to the presence of a fixture having a gap to accept the lineal. No motive force is applied to the lineal until the head is moved into engagement with the lineal. The first two sensors or switches 302, 304 signal the controller when the lineal moves into the transfer zone 200. The sensors or switches 302, 304 are located on the infeed side of the station and the switch 306 is on the exit side. One switch 302 causes the controller to bring in a horizontal roller clamp 308 into contact with the lineal prior to the lineal entering the heated roller zone. A second switch 304 brings the heated roller into contact with the lineal. Once the lineal moves forward through the transfer zone, its presence will trip the third switch 306 which will bring in a second horizontal roller clamp 309 into contact with the side of the lineal to keep its movement stable as it exits the station. Once the trailing end of the lineal passes the switch 302 and the second switch 304 the $1^{St}$ clamp and the heated roller will retract. When the trailing end passes the third switch 306, the roller clamp 309 is retracted. The horizontal clamps 308, 309 are only used when there are no custom backing fixtures in place at the station.

Successive lineals are maintained in abutting relation as they are placed in succession into the first workstation 12a. Retraction of the head that rotates the roller 62 occurs when it is determined that a trailing edge of the lineal has passes a third sensor 306 and no lineal is sensed by the sensor 302.

The Oven

The oven 132 (FIGS. 13 and 14) includes four elongated infrared heating elements 350-353 mounted in proximity to interior walls 360-366 of the oven. When energized with appropriate voltages the heaters 350-353 rapidly heat the roller 62 primarily by infrared radiant heating. While the majority of heating is due to radiant heating from the IR heater elements, there is also a smaller percentage of heating delivered to the roller by convection caused by the heated air trapped inside the oven interior. Activation of the heating elements heats an outer surface or face of the roller 62 used to apply heat and pressure to the film when the rotating roller is moved into contact with the film. As described more fully below, the heating elements 350-353 heat the roller 62 to a relatively uniform temperature of from 350 to 600 degrees F.

Figure 13:
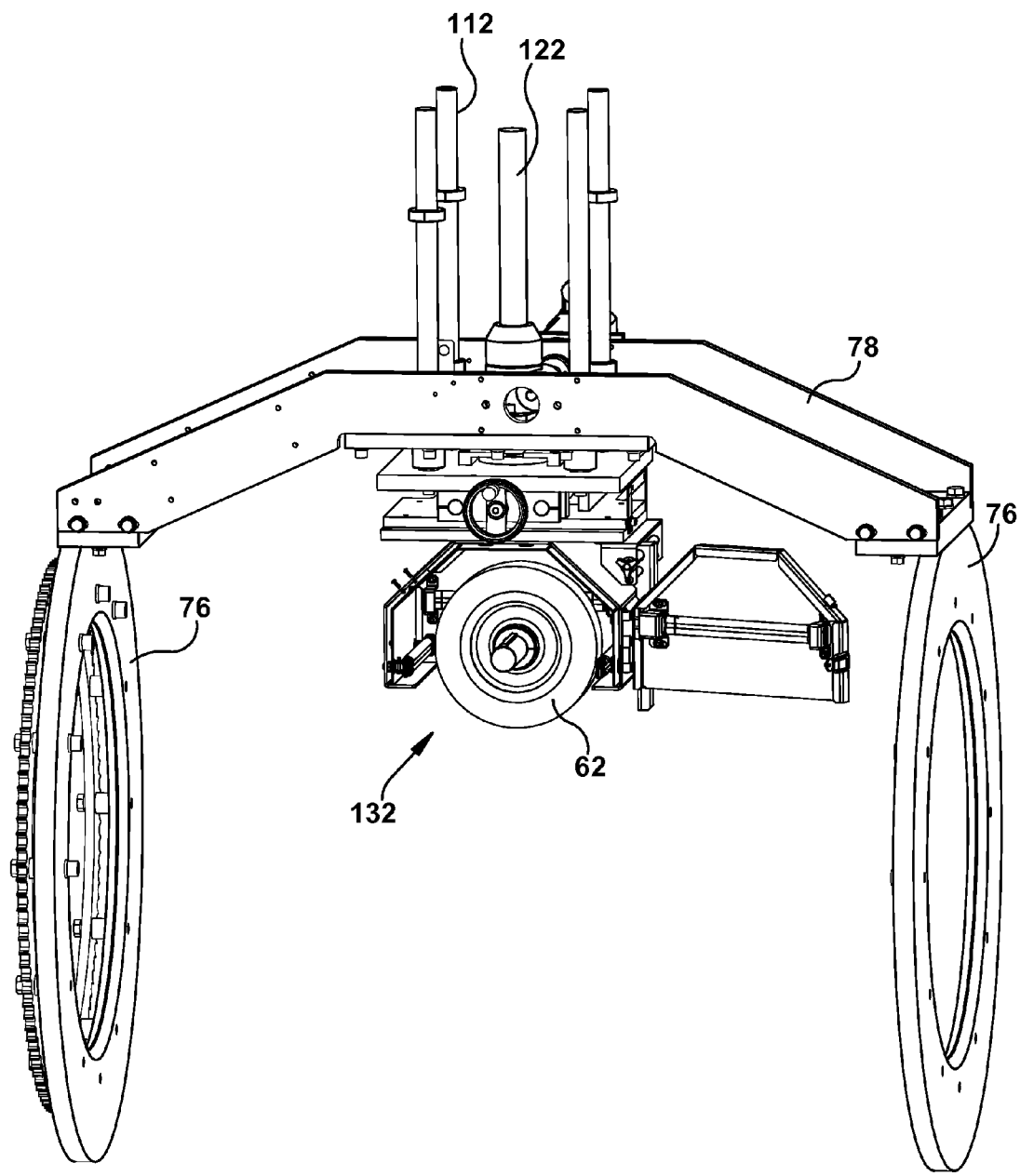
FIGS. 13 and 14 are perspective views of an oven for heating an outer heat and pressure applying face of a roller.
Figure 14:
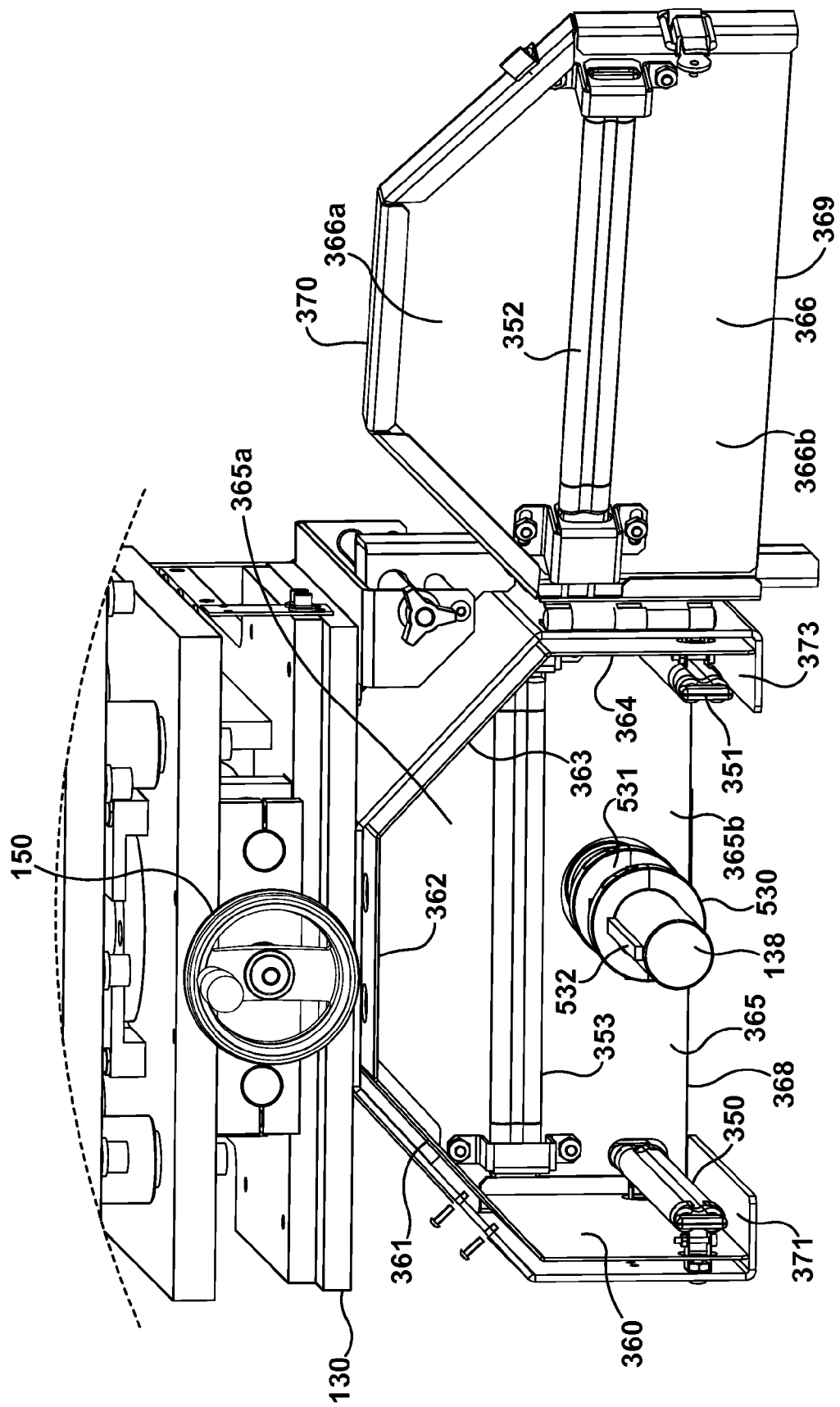

As depicted in FIGS. 13 and 14, a door 370 defines the interior wall 366 of the oven and is hinged for pivoting about an axis. For the oven orientation depicted in FIGS. 13 and 14, the door 370 pivots about a generally vertical axis but it is appreciated that as the head is rotated, the oven rotates about a horizontal axis to adjust the angle of contact between the roller 62 and the elongated component or lineal 20 for different target surfaces treated at different work stations along the component's path of travel.

During set up, the door 370 is opened by the user and an appropriate roller mounted to a keyed driveshaft 138 for use at a given film application station. FIG. 14 depicts the oven with the roller removed from its drive shaft 138. The drive shaft is supported by a bearing that extends through the wall 365 and is coupled to the drive 50 on an opposite side of the wall 365. During set up of the system, a user mounts an appropriate one roller (generally centered between the walls 365, 366) within the oven and closes the door to allow the heaters to rapidly heat the roller 62.

Five of the interior walls 360-364 of the oven define an arcuately extending inner wall that wraps around the roller from an input side of the oven to an output side of the oven. Two planar side walls 365, 366 extend generally parallel to each other and are spaced apart by a region occupied by the roller 62. The inner wall 364 that extends across the input side of the oven supports the elongated IR heater 351 and the inner wall 360 that extends across the exit side of oven supports a second elongated IR heater 350. Two additional elongated IR heaters 352, 353 are mounted to the support walls 365, 366. When the door 370 is closed the heaters 352, 353 (and walls 365, 366) extend in a direction generally parallel to the linear path of travel of the elongated components or lineal as they move past the roller 62.

The wall 365 has a first trapezoidal portion 365a and a second rectangular portion 365b through which the drive shaft 138 extends. Similarly, the wall 366 has a first generally trapezoidal section 366a and a second rectangular section 366b. Wall edges 368, 369 of the two rectangular sections extend parallel to each other and are spaced apart from each other a sufficient distance to accommodate all roller widths and side to side positions of the rollers for different lineal treatment surfaces. As seen in FIG. 13, when a typical roller 60 is mounted on the drive shaft 138, less than one half the roller extends beyond the two edges 368, 369 to a region of the lineal. In the preferred embodiment the rolls have diameters that range from 6 to finches, have a width of from ½ to 6 inches and can be side shifted using the crank 150 (FIG. 5, or other appropriate drive) a distance from one extreme location (nearest the wall 365 for example) to an opposite location nearest the door 370.

As described above in reference to FIG. 3a, the orientation of the roller 62 is adjusted depending on the target surface of the component 20 that is being treated at a given application or work station. Activation or energization of the infrared heating elements 350-353 is adjusted in accordance with an adaptive heating control method that takes into account the different control parameters at a given application station. One feature of the exemplary system is use of infrared heaters 352, 353 located within the oven along the side of the roller that are energized in a controlled way to produce better uniformity in temperature across a face of the roller. An exemplary system can re-orient the face of the roller through an angle of 180 degrees (+/−90 with respect to the vertical). Energization of the IR heaters 350-353 changes or adapts based on this angle causing the outside diameter surfaces of the roller 62 that contacts the lineal to reach a more uniform temperature before the roller is brought into contact with the decorative film F as it is pressed against the lineal 20.

Figure 3B:
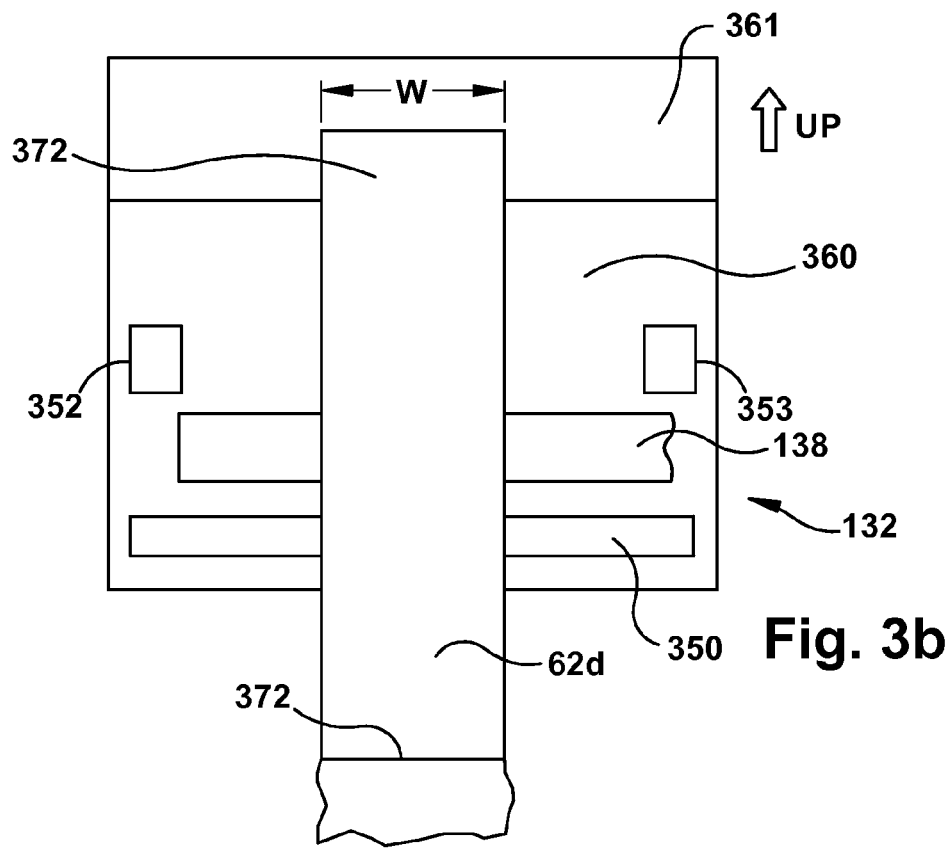
FIGS. 3b and 3c depict two different heating oven and treatment roller orientations at different workstations along a component path of travel.
Figure 3C:
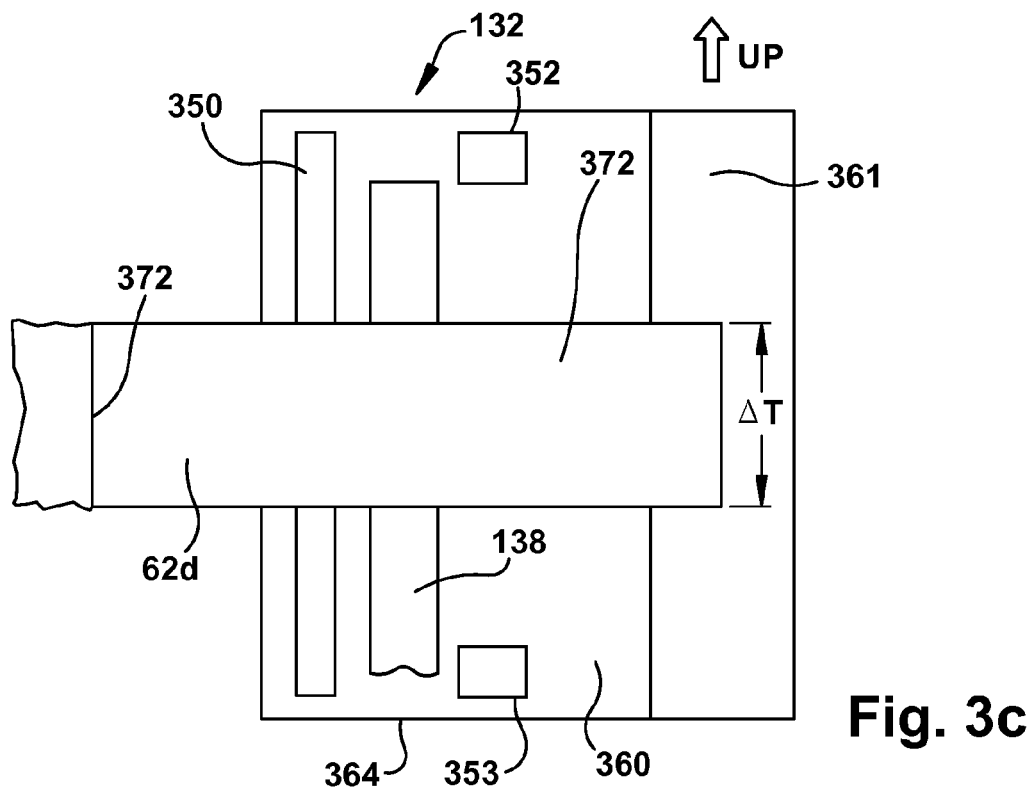

Consider the schematic depictions shown in FIGS. 3b and 3c. In FIG. 3b, the roller 62d is supported by the shaft 138 and is oriented generally vertically as an outer roller face 372 of the roller contacts a lineal having a horizontal outer surface that is treated or decorated with film. In FIG. 3c, the roller 62d (and oven) have been rotated through an angle of 90 degrees and the face 372 is brought into contact with a lineal having a generally vertically oriented surface that needs to be treated or decorated with film.

First consider an oven 132 in which only the elongated heaters 350, 351 are situated with respect to the roller 62d on an input and an output side of the oven. With the roller 62d oriented vertically, the heaters 350, 351 extend transversely to a width W of the roller. Heated air rises from the heaters 350, 351 to a region above the roller in the vicinity of the wall 362 and a there is good uniformity (relatively small gradient) in temperature across the width W of the roller.

Now consider the situation (FIG. 3c) in which the roller 62d rotates about an essentially vertical axis on the shaft 138 so that the face 372 can treat a vertical surface of the elongated component. Assume only two heaters 350, 351 mounted to the input and output side walls 364, 360 of the oven are available for heating the roller face 372. Hot air rises away from the heater, but since a side of the oven is now open, much of the hot air escapes from an opening through which the roller extends. Additionally, since the hot air rises away from a region of the oven next to the wall 364 a noticeable temperature differential Δ T of as much as 150 degrees F. develops across the face 372 of the roller.

Minimization of the temperature differential across the face is one important aspect of the disclosed oven. Temperature uniformity is achieved at least in part through the addition of two additional IR heaters 352, 353 mounted to the interior of the oven. Consider again the situation of FIG. 3c. In this situation, the adaptive process used in conjunction with the invention activates or energizes the heater 353 but not the heater 352. Selective activation of these additional IR heaters 352, 353 cannot completely remove the temperature gradient caused by the re-orientation of the oven and non-uniformity caused by the heat rising within the oven, but it can reduce this temperature gradient across the width of the roller face 372 to an acceptable value such as 20 degrees F.

An IR sensor 320 mounted to the outside of the oven 132 (FIG. 15) monitors the temperature of the roller's outer face to help maintain the roller at a set point temperature or temperature range and further to prevent damage to the roller due to overheating. A representative IR temperature sensor is commercially available from Micro Epsilon under part number 4800103.03 and includes an integral controller that converts an analog signal from the sensor to an analog voltage output. The sensor 320 produces an analog output signal proportional to sensed temperature which is converted to an analog electric signal processed by the associated subsidiary controller at the workstation and used to drive the heater in a closed loop manner. The mount for this sensor 320 allows the sensor to be shifted to the side to accommodate different positions of the roller within the oven as well as determine a temperature of different portions along the outside face of the roller. Use of multiple sensors (not shown) for sensing different roller face portions without user adjustment is an alternate possibility.

A subsidiary programmable controller 300a (at the station 12a) modulates activation of the heating elements 350-353 to cause the sensed temperature of the roller to be maintained at or near a target temperature and also limits the temperature differential across each of the rollers that are used in treating the elongated components. One suitable example of IR heating elements 350-353 supported within the oven are commercially available twin tube infrared elements obtained from Honesom Enterprise Co. Ltd of Taiwan (www.honesom.com) under part number T-SW1123B. They are a twin tube & filament arrangement 23 mm wide×11 mm tall having a figure-8 shape. In the center of each side of the figure-8 is a filament that runs along the length of each tube. The heating elements depicted are ten inches long but other lengths could be chosen for other oven/roller dimensions. The preferred oven is a double wall construction with inner wall panels spaced from an exterior wall by set offs. The inner wall panels are preferably constructed from highly polished 300 series stainless steel metal that reflects infrared wavelengths impinging on the panels from the IR heaters.

Figure 12:
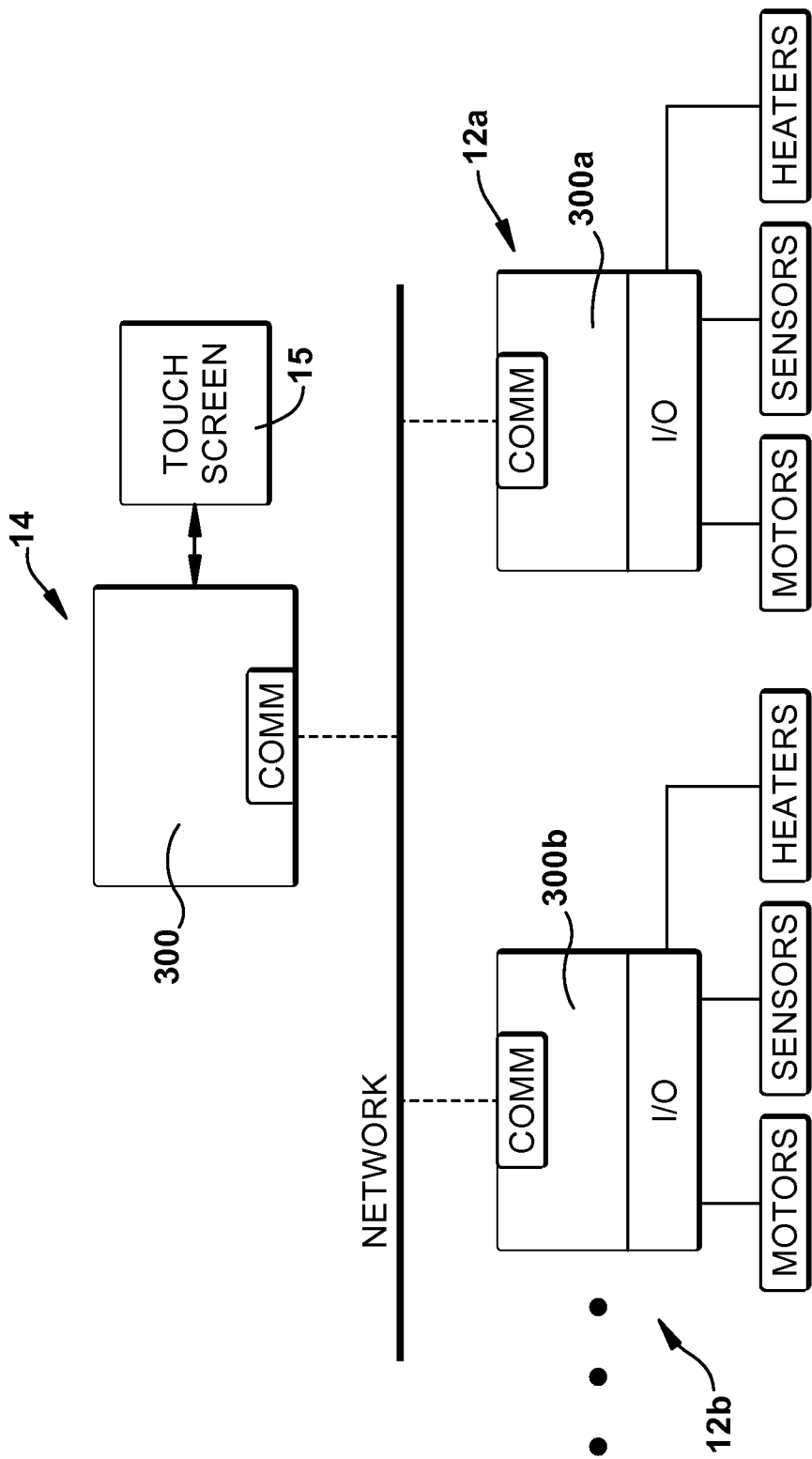
FIG. 12 is a schematic block diagram of a control system for controlling the exemplary decorative tape application system.
Figure 15:
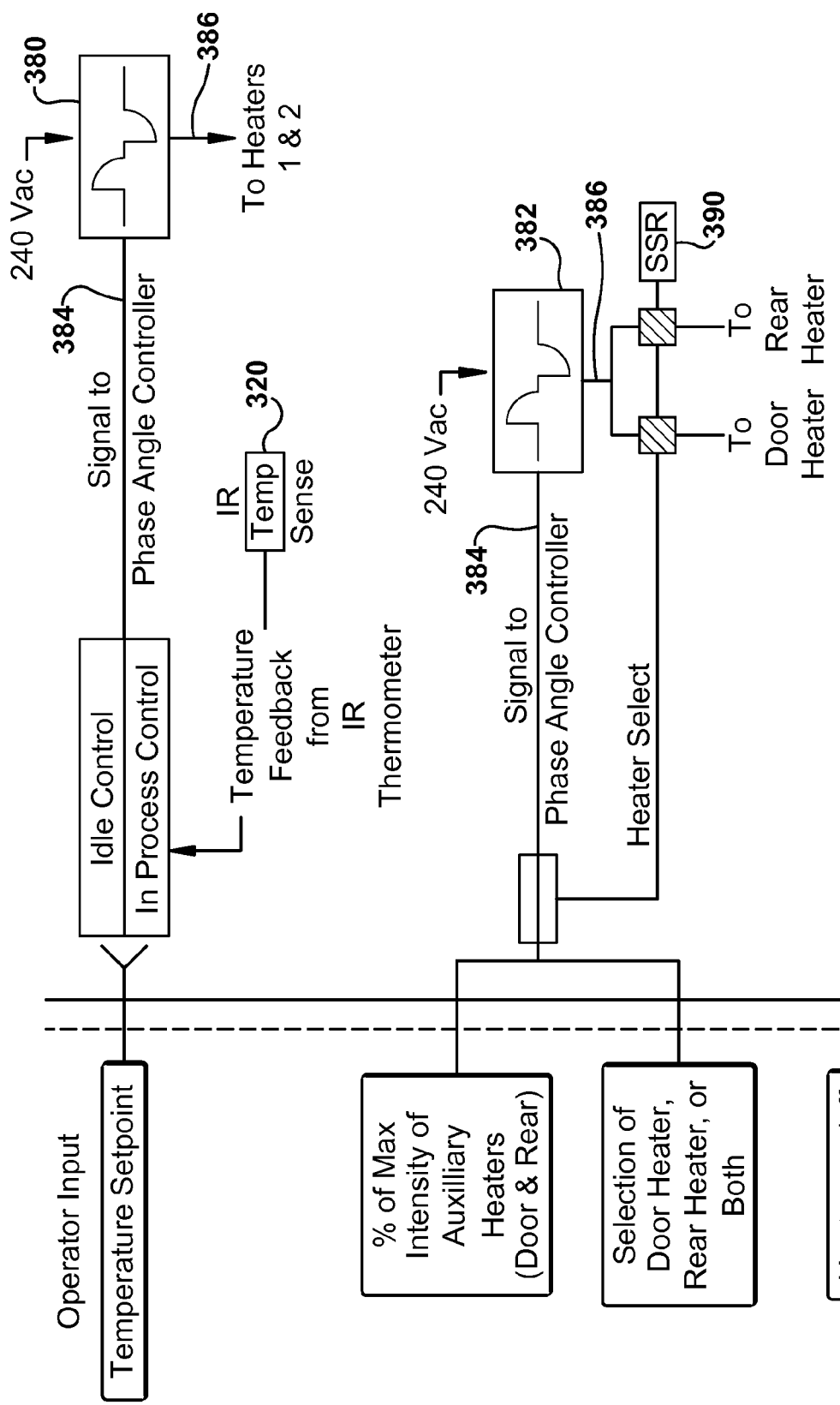
FIG. 15 is a schematic depicting energization of IR heater elements supported within the oven of FIGS. 13 and 14.

FIGS. 12 and 15 depict the relation between the controller 300 and multiple work station programmable subsidiary controllers 300a, 300b etc., which communicate with the controller by means of a network interface. Each of the subsidiary controllers (for example 300a) has an interface for controllably actuating the four heaters that are mounted to the oven mounted at a given work station (12a for example). More particularly, each of the work station controllers 300a, 300b etc includes an interface for the heaters and implements a heater energization protocol particularly suited for that work station. Stated another way, every station has its own recipe or protocol for IR heater activation depending on the dimensions of the roller, profile (contour or angle) of the roller, the angle of orientation of the roller during use, and the side to side positioning of the roller within the oven. The roller can be oriented closer to one side-wall or the other, regardless of rotation orientation. The protocol can also be adjusted based on the type of film and the material used in fabricating the elongated component, or to correlate with increased or decreased throughput speeds of the component through the system 10. A possibility exists that the heaters do not have sufficient capacity to properly heat or maintain the roller face temperature for higher throughput speeds or wider roll faces. It would be reasonable under such circumstances to configure the oven with additional IR heaters, having similar control schemes to the described methods in order to accommodate the needed heat capacity. Since the angle of the head is known by the controller based upon feedback obtained using an encoder mounted to the ring 76, the controller can automatically regulate and control the front and back emitters 352, 353 based upon the angular position of the head.

FIG. 15 is a block diagram showing the user interface for controlling the IR heaters as well as a schematic of the circuitry that energizes the heaters. Each of the IR heaters responds to a 240 volt alternating current signal applied across its terminals. The manner of energization for a heater is described more fully in the specification sheets for the Honesom T-SW1123B heater which is incorporated herein by reference. The representative circuit for energizing four IR heaters includes two phase angle controller drive circuits 380, 382. Each of these circuits receives a dc signal (varying from 0-10 volts) at an input 384 and produces a phase angle controlled output 386 of an appropriate shape based on the signal at the input 384. A preferred phase angle controller is commercially available from Watlow under part number DC10-24P5-0000 whose specification sheet is incorporated herein by reference. The drive circuit controls power to the heater by adjusting the shape of the alternating current waveform applied to the heaters in the zero crossing region of the waveform. At startup, a maximum energization occurs until a region of the target temperature is reached and thereafter a closed loop temperature control is implemented by the station controller 300a, 300b etc.

In the representative system the two heaters 350, 351 are energized at the same level by the driver 380. In one exemplary embodiment, the level of energization is dependent on the desired temperature. Deviations from that temperature cause the subsidiary controller to which the heater is coupled to adjust the input signal 384 to achieve the desired temperature by means of a feedback analog signal from the sensor 320 to an I/O input to the controller 300a for example, which responds to adjust heater activation of the heaters 350, 351 to implement a closed loop control. The drive 382 activates neither, a selected one or both of the heaters 352, 353 depending on a user selectable input which is used to adjust a status of a solid state relay 390 that selectively transmit power from the output 386 of the driver to the heater or heaters 352, 353. The two drivers are independent from each other and are adjusted to apply a percentage of maximum input to the heaters. When 100% is chosen, the a.c. waveform to the heater is not chopped or modulated at the zero crossing region.

Figure 16:
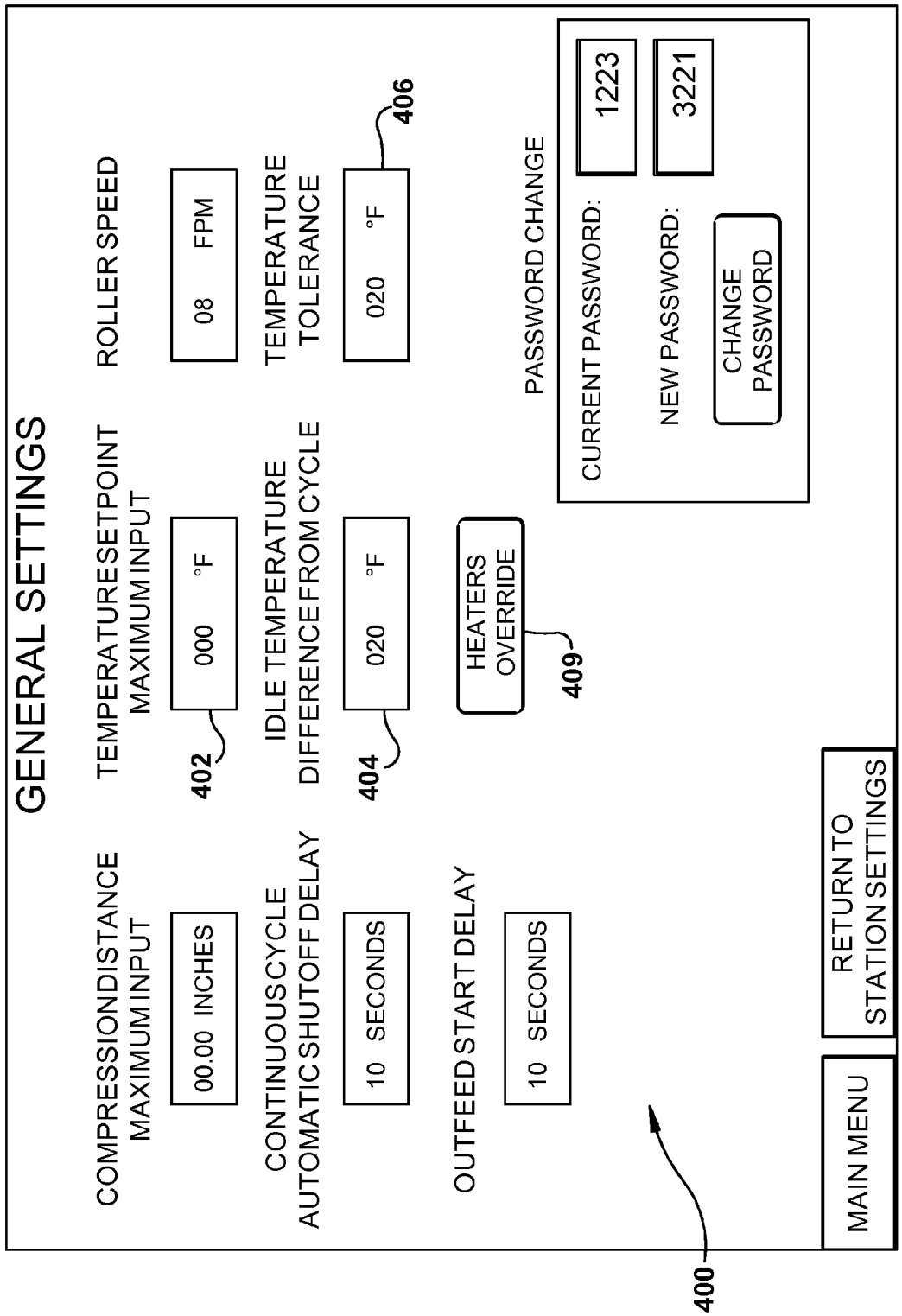
FIGS. 16-18 are user interface depictions presented to a user during set up and operation of an exemplary system.
Figure 17:
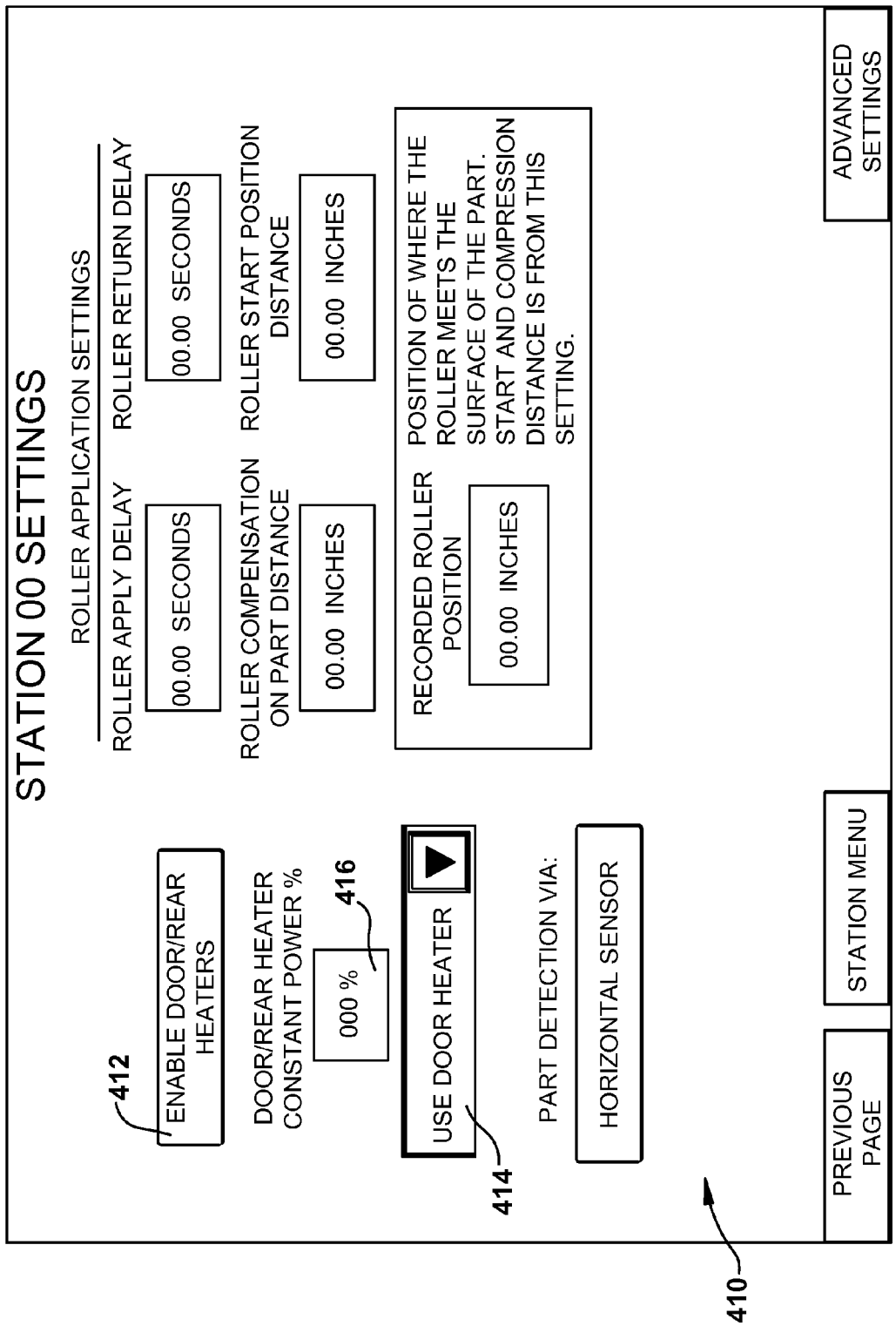
Figure 18:
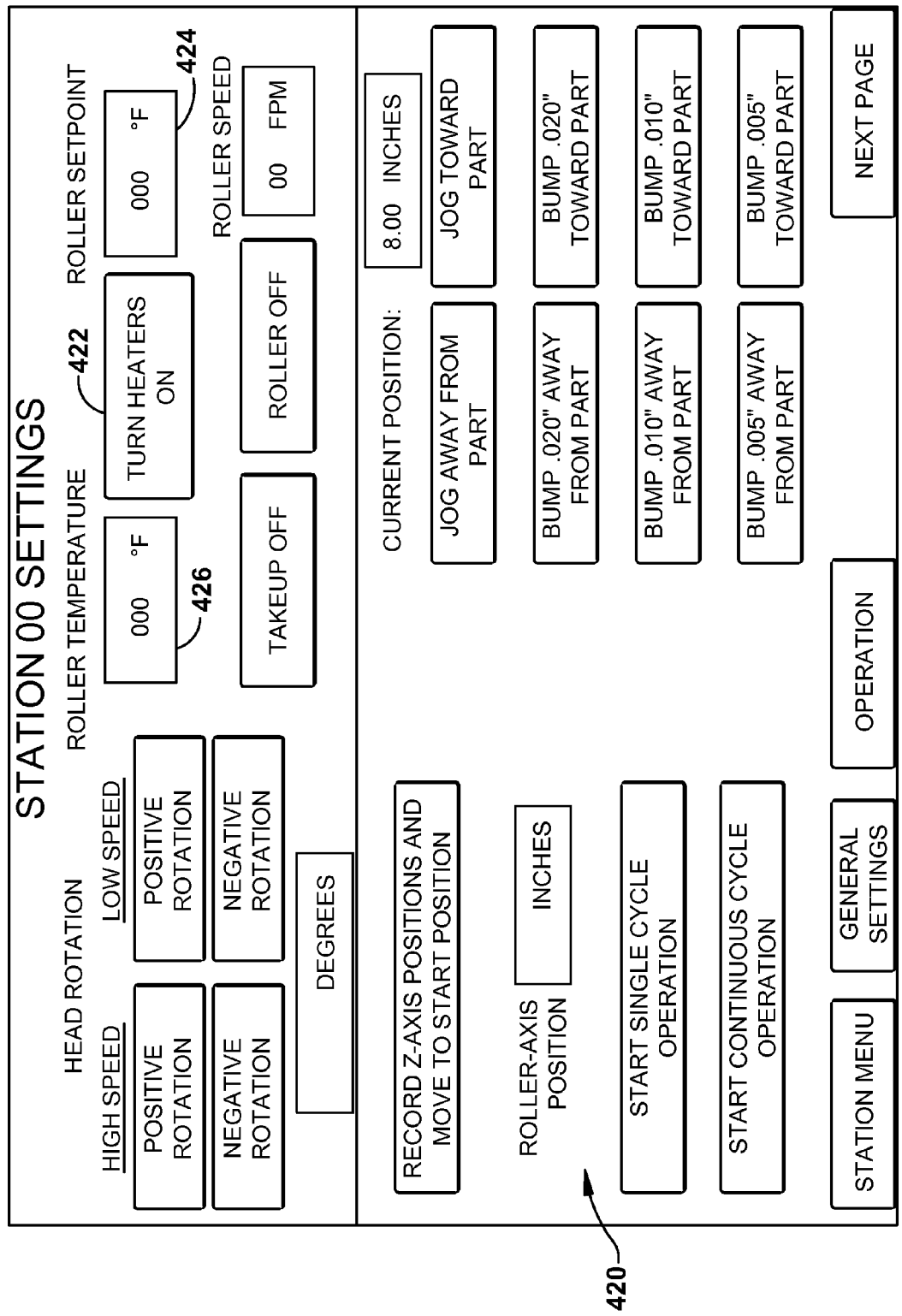

FIGS. 16-18 are depictions of three different user interfaces 400, 410, 420 presented to the user during operation of the system. A first screen 400 having the heading "General Settings" (FIG. 16) presents touch screen controls applicable to all of the multiple stations that make up the system. Three input controls 402, 404, 406 concern system wide temperature control settings. A first control 402 allows a maximum temperature to be set. The user touches the control 402 and then enters by the keyboard a maximum allowable system roller temperature. If this maximum temperature is reached by any of the multiple rollers 62, an alarm is sounded and/or shut down of the system initiated. The maximum temperature value will typically be an amount above the set point of the highest station setting of the multiple stations that make up the system. A control 404 allows the user to input a desired temperature difference between an idle temperature of the rollers and the active or operation temperature. The use of the infrared heaters allows the roller to be brought up to temperature within a few seconds of receipt of a command to do so. A control 406 allows the user to choose a temperature tolerance or difference between a target temperature for a station and the actual sensed temperature. A sensed temperature at a given station that exceeds (either above or below) this tolerance causes an alarm to be sounded. An input control 409 allows a user to run an elongated component through the system even though the heaters have not heated the roller up to a prescribed temperature. In other words even though the temperature of the roller is not adequate for good results the elongated component can be routed through the stations in sequence to determine if the path defined by various backings and guide rolls are in place and working.

Turning to FIG. 17, this interface 410 has a touch screen input 412 that is actuated to turn on the heaters 352, 353 on the rear and door walls. A second input 414 allows the user to select one or the other or both heaters 352, 353 for activation. Finally an input allows the user to choose a percentage of maximum power to activate the chosen one or both heaters 352, 353. FIG. 18 has an interface 420 having an input 422 for turning the heaters on and off at a particular one of the workstations. A roller setpoint input control 424 for setting the target or optimum roller temperature at a given workstation. An output 426 indicates the actual sensed temperature at a workstation in degrees F.

In operation, control of the system's motors, heaters, and sensors is divided between the main controller 300 and the subsidiary controllers 300a, 300b etc. The controller 300 is programmed to present the user interface to the user and then communicates commands to the subsidiary controllers via the network to implement the user commands. At start up, the interface 400 is presented and the user is prompted to enter a password. Some passwords are recognized as belonging to supervisory personnel and allow greater control over the system such as an ability to adjust the maximum setpoint temperature input 402. Other users such as production workers have more limited access to system control.

At each of the multiple work stations, a target set point temperature for the roller face is set. In one embodiment, an automatic or default setting is provided by the controller 300 based on the component that is being treated. In an alternate embodiment this is input via the control input 426. Regardless of which of these two embodiments is available, the user can override the default setting. In a similar manner, the controller 300 can provide a default energization mode for the side heaters 352, 353. One or both of those side heaters can be energized and a level of power for those heaters dictated by the controller 300. In that mode, the two inputs 416, 414 are updated on startup to show a user the default side heater energization setting. These can be overridden by the user so that for example the user could accept the determination that only the door heater 352 should be activated but he or she could override the power level by inputting a different level at the input 416. If the user must constantly override the default settings for side heater energization, it is an indication that the default energization scheme should be changed and a supervisor with acceptable credentials may do so.

In one embodiment, the system 10 includes a width monitoring ultrasonic sensor commercially available from Banner as part number S18UUARQ to warn a user when the film F is not an appropriate width for the lineal surface being treated or covered.

Recipe Control of Film Coating

Table one, illustrated below, represents data contained within a database stored in the controller 300 representing parameters that are used during setup and operation of the system 10. In the illustrated example embodiment, the data depicted in this table is presented on a viewing monitor in spreadsheet format with each of the table columns presented as a row of data representing a given combination of lineal, workstation backing fixture etc. This data is visible to an operator at either a master set up station that illustrates the status and setup parameters for multiple workstations or at an individual work station (12a for example) associated with a particular one of the multiple workstations that combine to form the entire system.

TABLE 1

|  | Surface 3 | Surface 4 | Surface N |
|---|---|---|---|
| Fixture Part No | FX-111037-050 | FX-14530-050 | ... |
| Roller Part No | 3-26007-1 | 3-26007-1 | ... |
| Fixture Station | Station 3 | Station 2 | ... |
| Roller Offset (inches) | 1 | 0.75 | ... |
| Head Rotation (deg) | 36 | 38 | ... |
| Film Rotation (deg) | 60 | 65 | ... |
| Z Axis | −0.17 | −.25 | ... |
| Y Axis | 1.17 | 1.45 | ... |
| Film width | .75 | .75 | ... |
| Temperature (F.) | 400 | 400 | ... |
| Compression (in) | .12 | .12 | ... |
| Front Door heater (%) | 10 | 25 | ... |
| Rear heater(%) | xx | yy | ... |
| Film arm # | 1 | 1 | ... |
| Speed (feet per minute) | 10 | 10 | ... |

Figure 19:
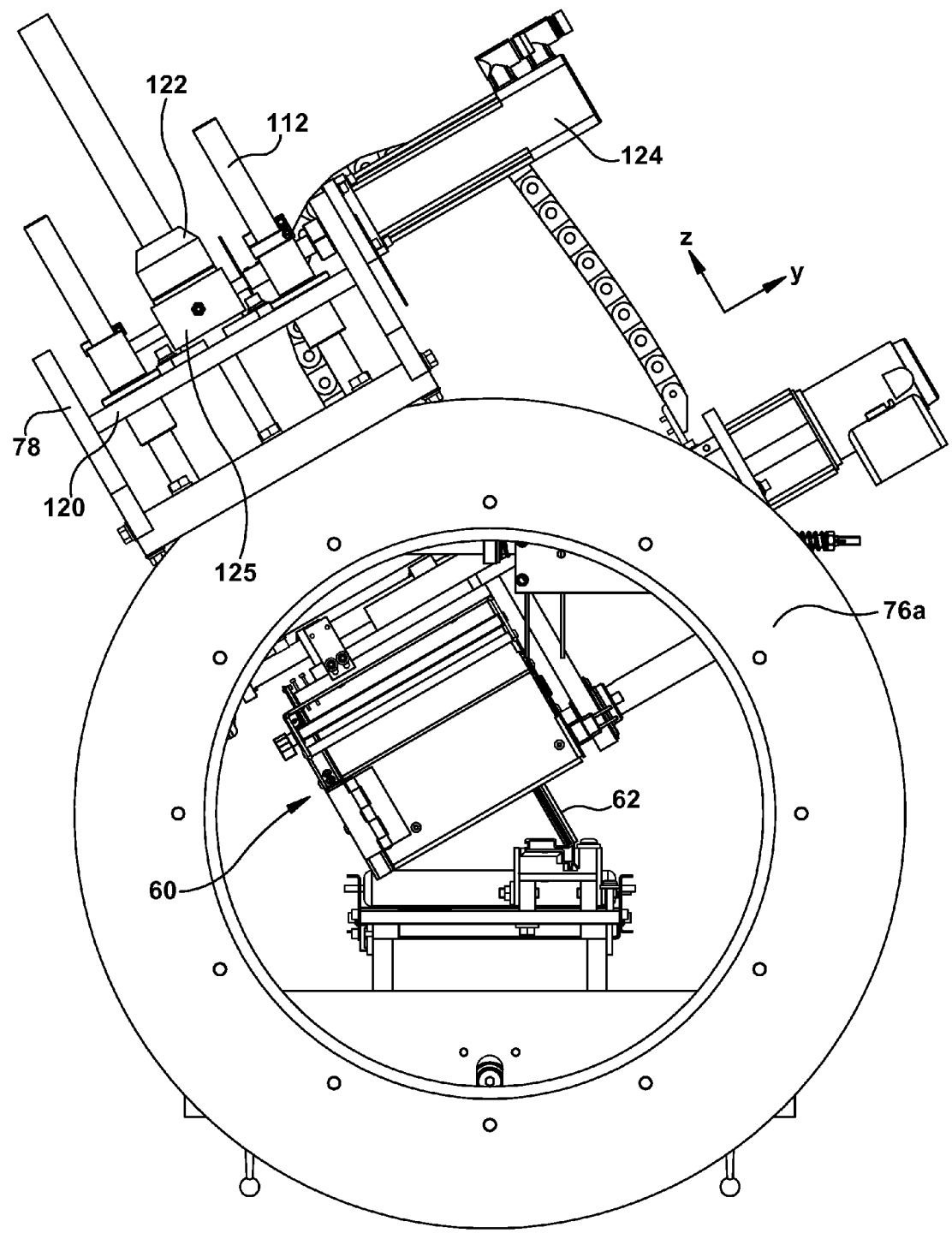
FIG. 19 is an end elevation view of a roller positioned relative to a lineal moving past the head.
Figure 20:
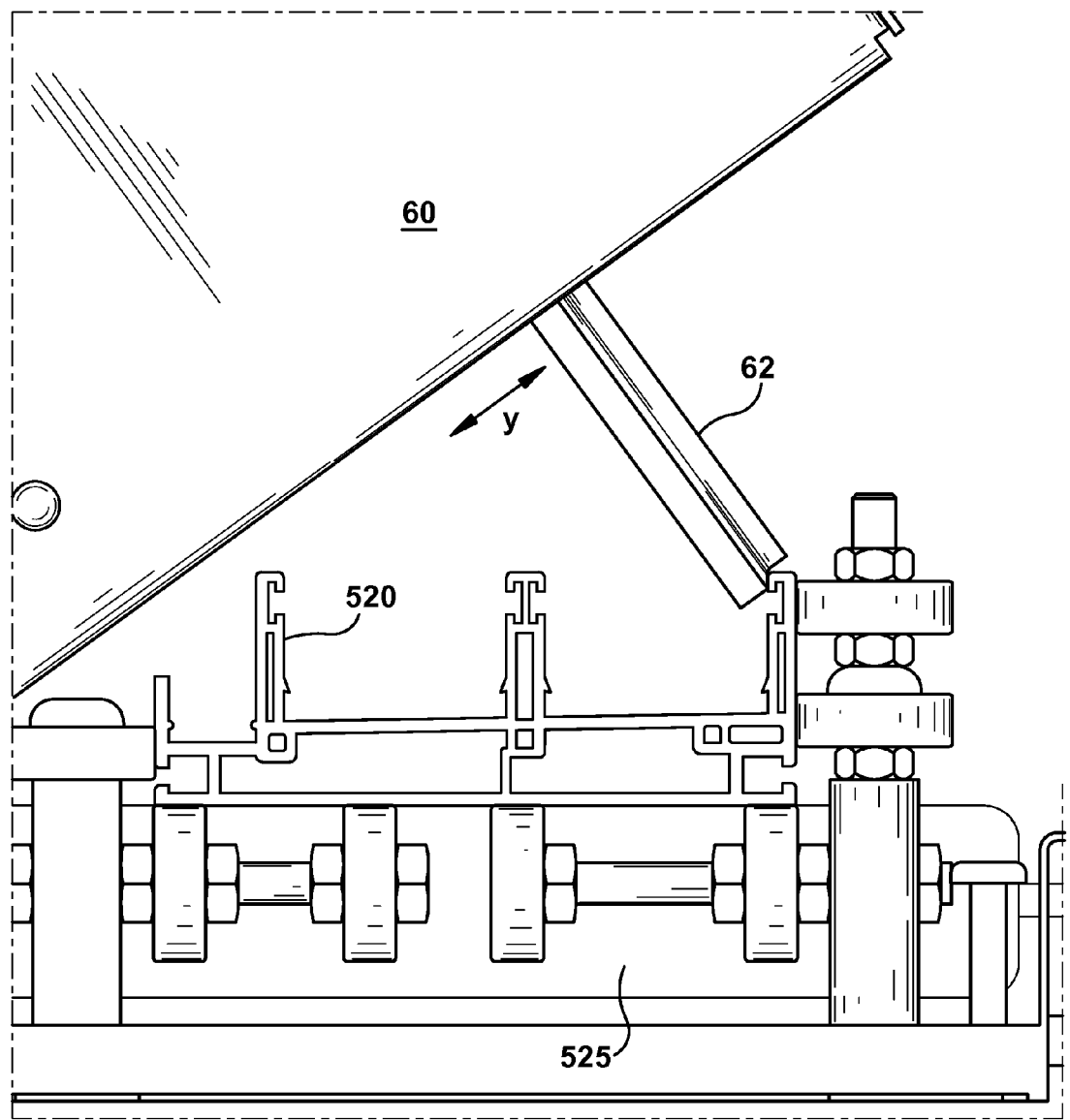
FIG. 20 is an end elevation view of a roller positioned similar to FIG. 19 but on an enlarged scale.

An orientation and position of the roller in relation to two different fixtures referenced in table 1 is depicted in FIGS. 19 and 20. Note, surface 3 and surface 4 are two different surfaces depicted on a lineal 520 moving along a linear path of travel. The data of Table 1 describes appropriate orientations and positions to heat and apply pressure for rollers at two consecutive work stations. A Y-Z co-ordinate system is depicted in the Figures wherein a Y co-ordinate indicates side to side positioning of the roller with regard to a reference position and the Z co-ordinate indicates in and out movement of the head toward and away from a reference position of the head 60. In the illustrated example embodiment, the Z co-ordinate reference position corresponds to a specific encoder output from the motor 124.

The information conveyed in Table 1 is described from top to bottom.

A first entry of the table is a part number for the backing fixture 525 that supports the lineal in its movement from the input to output side of a workstation. The information of the table is presented on a viewing monitor so that an operator can refer to the information during both set up and operation of the system. Once the operator chooses a particular lineal, the viewing monitor displays the fixture information the operator needs to mount at a particular workstation from one or a number of such fixtures in inventory.

A second entry of the table is the part number for the roller at a given station. Just as the fixture must specifically match the lineal it supports, the roller at a particular work station must match the surface of the lineal treated with film at that specific workstation.

A third entry in the table is the identifier for the work station. If a large number of discrete surfaces are covered with film, a large number of workstations are positioned along the path of lineal movement to treat each such surface.

A fourth entry is an offset of the roller from an endmost possible position within the oven. FIG. 14 depicts two shaft collars 530, 531 having a keyed slot that slips over a radially extending key 532 on the shaft 138 that supports the roller. During set up option (different width) spacers are placed between the inner collar 531 and a roller hub to space the roller a specified distance from an innermost (within the oven) position of the roller and this table entry specifies the width of the spacer (in inches).

A fifth entry in the table specifies an amount of angular rotation of the entire head 60 in relation to a vertical orientation of the head. This rotation is accomplished by the controlled energization of the motor 82.

A sixth entry in the table is a rotation from the vertical lineal to be treated. This adjustment is presently accomplished by manual positioning of the inner rings 74a, 74b with respect to the outer rings. The value listed in the table for this setting is in degrees of rotation with respect to the vertical.

A seventh entry in the table is in an out position (in inches) of the head toward and away from the lineal with respect to a reference. The number in this table entry is in relation to a home or reference position for the head as indicated from the encoder of the motor 124. During initial set up, an operator rotates the head to an appropriate orientation and then, with the roller rotating manually jogs the motor 124 moving the head from its home position until the roller just touches the lineal surface to be treated enough to move the lineal out of the workstation.

An eighth entry in the table indicates a side to side position of the head with relation to a home position. This side shifting is in addition to the amount of shift achieved by the spacer denoted in entry 4 of the table. This additional Y axis shift is achieved by means of the hand operated crank 150, but could also be an automatic motor powered adjustment.

A ninth entry in the table indicates a film width in inches.

A tenth entry in the table indicates a target temperature of the roller.

An eleventh entry in the table indicates an amount of compression to be applied during film application by the roller. Different rollers have different degrees of hardness or engagement width and in order to apply a desired amount of pressure to the film as the film moves between the roller and the lineal, the roller position may be adjusted to apply a small additional offset (either positive or negative along the z axis (radial in or out)) to control the pressure applied by the roller. This amount is in inches and may be adjusted based on system performance.

A twelfth value in the table is the percentage energization for the front (door) heater 352 relative to full eneregization.

A next, thirteen value in the table is the percentage energization for the rear heater 353 and regulates the heat applied to the roller within the oven.

A next, fourteenth value in the table is a part number for the film guides 250, 252 which are specified from a group of such guides.

A last entry in the table is the speed of movement of the lineals through the successive stations.

In the illustrated system a window or door lineal is typically extruded vinyl and may include a center or middle channel/track used to support a window sash or door assembly. However, the component or lineal as now defined and used throughout both the specification and claims, also includes any size or shape window, door, or part forming the window, door, or supporting track assembly, including but not limited to, stiles, rails, tracks, frames, jambs, headers, sills, and channels on both interior and exterior sides of the window or door without departing from the spirit and scope of the claimed disclosure. In addition, the material composition forming the component is not limited to vinyl, but could be any type of material, including without limitation, metal, plastic, fiberglass, polymeric composition, or naturally existing material. Further the surface of the component could be cleaned or treated, for example with a sealant or painted prior to use by an applicator assembly constructed in any of the example embodiments of the present disclosure. It is within the spirit of the present claimed disclosure that the numerous uses of the term "component or lineal", whether in singular or plural form throughout the various example embodiments of applicator assemblies herein embrace the full scope of the aforementioned definition.

The exemplary system has been described with a degree of particularity. It is the intent, however, the invention include all modifications and alternations from the disclosed design falling within the spirit or scope of the appended claims.

The invention claimed is:

1. A method for applying a decorative material to a target surface of an elongated building component comprising:
   a) moving one or more elongated components along a path of travel through a film application station having a generally cylindrical transfer roller mounted for rotation with respect to and supported in part within a housing;
   b) heating the transfer roller with a plurality of elongated infrared heaters by
      i) mounting the elongated infrared heaters to an inside surface of said housing between interior walls of the housing and the transfer roller wherein one or more elongated infrared heaters are oriented generally parallel to an axis of roller rotation and one or more additional elongated infrared heaters are mounted transverse to said axis of rotation and ii) controllably energizing the elongated infrared heaters so that heat from the elongated infrared heaters flows from the heaters to an outer surface of the transfer roller;
   c) applying heat and pressure to a decorative layer of an elongated film with the heated transfer roller as the elongated component moves through the film application station wherein an outer, heat and pressure applying surface of the roller has a width and contour based on the target surface to be treated with the decorative layer;
   d) monitoring a temperature of the outer surface of the transfer roller; and
   e) presenting a user interface on a computer monitor which allows a user to choose from a menu of different elongated components and based on the chosen elongated component, applying a recipe of parameters that include positioning of the transfer roller to control pressure applied by the roller and energization of said elongated infrared heaters to control variations in the temperature across a width of the outer surface of said transfer roller.

2. A method for applying a decorative material to a target surface of an elongated building component comprising:
   a) determining a specific elongated building component from a plurality of different shaped possible elongated building components for treatment at a film application station;
   b) mounting a transfer roller having an outer, pressure applying surface whose shape is based on a target surface of the specific elongated building component for movement with an oven for heating the pressure applying surface of said transfer roller; said oven including an oven housing which supports a plurality of infrared heaters spaced from each other and located between interior walls of the oven housing and the outer, pressure applying surface of the transfer roller;
   c) based on the specific elongated building component to be treated at the film application station, orienting the oven housing and transfer roller so that the outer pressure applying surface of the transfer roller is properly oriented to apply heat and pressure to a decorative film overlying the target surface of said specific elongated building component;
   d) controllably energizing the infrared heaters based on the orientation of the oven housing supporting said infrared heaters so that heat from the infrared heaters flows from the heaters to the outer, pressure applying surface of the transfer roller to control variations in the temperature across a width of the outer, pressure applying surface of said transfer roller;
   e) moving one or more of the specific elongated building components to be treated along a path of travel through the film application station; and
   f) applying heat and pressure to a decorative layer of an elongated film with the outer, pressure applying surface of the heated transfer roller as the film contacts the target surface of the specific elongated building component moving through the film application station.

3. The method of claim 2 further comprising: mounting the transfer roller to a moveable carriage for orienting the transfer roller to an appropriate orientation with respect to a path of travel of the specific elongated component and adjusting pressure to a film contacting an appropriate surface of the elongated building component by controlling an in and out position of the transfer roller with respect to the path of travel.

4. The method of claim 3 wherein the step of adjusting the pressure is performed by determining a first radial position of the transfer roller that contacts a surface of the elongated building component and then adding a displacement from said first radial position to position the transfer roller at a second, in use, radial position for the transfer roller.

5. The method of claim 2 wherein a controller coupled to a computer monitor presents a menu of different elongated building components having different profiles for treatment and wherein the controller responds to user selection of the specific elongated building component by automatically implementing a recipe of parameters for the specific elongated building component.

6. The method of claim 5 wherein there are multiple workstations along a component path of travel wherein each workstation comprises a temperature sensor that monitors a heat and pressure applying face temperature of a transfer roller at a given workstation and further comprising using a sensed face temperature to control infrared heater energization.

7. The method of claim 2 wherein the transfer roller is generally cylindrical and is mounted for rotation with respect to the housing, further wherein the infrared heaters are elongated and are mounted to an inside surface of said housing and wherein one set of elongated IR heaters are oriented generally parallel to an axis of roller rotation and a second set of elongated IR heaters are mounted transverse to said axis of rotation.

8. The method of claim 7 wherein there are multiple workstations along a component path of travel wherein each workstation comprises a temperature sensor that monitors a heat and pressure applying face temperature of a transfer roller at a given workstation and further comprising using a sensed face temperature to control IR heater energization.

9. A method for applying a decorative material to a target surface of an elongated building component comprising:
   presenting a user interface on a display which allows a user to choose from a menu of different elongated building components and based on a chosen elongated building component, applying a recipe of parameters comprising positioning of a transfer roller to control pressure applied by the transfer roller and controlled energization of a plurality of infrared heaters that heat the transfer roller;
   moving one or more elongated building components along a path of travel through a film application station;
   supporting a transfer roller in part within a housing and mounting the transfer roller and housing to a moveable carriage that rotates with respect to the path of travel of the one or more elongated building components;

orienting the transfer roller to an appropriate orientation with respect to a path of travel of the elongated building component based on the chosen elongated building component;

heating the transfer roller with the plurality of infrared heaters supported by the housing by controllably energizing the infrared heaters so that heat from the infrared heaters flows from the heaters to an outer, heat and pressure applying surface of the transfer rollers; and applying heat and pressure to a decorative layer of an elongated film with the heated transfer roller as the elongated building component moves through the film application station wherein the outer, heat and pressure applying surface of the transfer roller has a width and contour based on the target surface to be treated with the decorative layer; and monitoring a temperature of the outer surface of the transfer roller;

wherein energy applied to the plurality of infrared heaters is adjusted based on the choice of elongated building component selected by the user, the orientation of the transfer roller with respect to the path of travel, and the temperature of the outer surface of the transfer roller to control variations in the temperature across a width of the outer surface of said transfer roller.

10. The method of claim 9 further comprising: adjusting pressure to a film contacting an appropriate surface of the elongated building component by controlling an in and out position of the transfer roller with respect to the path of travel.

11. The method of claim 10 wherein the step of adjusting the pressure is performed by determining a first radial position of the transfer roller that contacts a surface of the elongated building component and then adding a displacement from said first radial position to position the transfer roller at a second, in use, radial position for the transfer roller.

12. The method of claim 9 wherein the transfer roller is generally cylindrical and is mounted for rotation with respect to the housing, further wherein the infrared heaters are elongated and are mounted to an inside surface of said housing and wherein one set of elongated IR heaters are oriented generally parallel to an axis of roller rotation and a second set of elongated IR heaters are mounted transverse to said axis of rotation.

13. The method of claim 9 wherein a controller coupled to a computer monitor presents a menu of different elongated building components having different profiles for treatment and wherein the controller responds to user selection of a chosen component by automatically implementing a recipe of parameters for the chosen component.

14. The method of claim 13 wherein there are multiple workstations along a component path of travel wherein each workstation comprises a temperature sensor that monitors a heat and pressure applying face temperature of a transfer roller at a given workstation and further comprising using a sensed face temperature to control infrared heater energization.

\* \* \* \* \*